US010735235B2

United States Patent
Lim et al.

(10) Patent No.: US 10,735,235 B2
(45) Date of Patent: Aug. 4, 2020

(54) METHOD FOR TRANSMITTING AND RECEIVING SIGNAL IN WIRELESS LAN SYSTEM AND DEVICE FOR SAME

(71) Applicant: LG ELECTRONICS INC., Seoul (KR)

(72) Inventors: Dongguk Lim, Seoul (KR); Jinsoo Choi, Seoul (KR); Hangyu Cho, Seoul (KR); Jinmin Kim, Seoul (KR); Eunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/743,998

(22) PCT Filed: Dec. 4, 2015

(86) PCT No.: PCT/KR2015/013226
§ 371 (c)(1),
(2) Date: Jan. 11, 2018

(87) PCT Pub. No.: WO2017/018615
PCT Pub. Date: Feb. 2, 2017

(65) Prior Publication Data
US 2018/0205584 A1    Jul. 19, 2018

Related U.S. Application Data

(60) Provisional application No. 62/198,111, filed on Jul. 28, 2015.

(51) Int. Cl.
*H04L 27/26* (2006.01)
*H04W 74/04* (2009.01)
(Continued)

(52) U.S. Cl.
CPC .......... *H04L 27/2608* (2013.01); *H04L 5/001* (2013.01); *H04L 5/0092* (2013.01);
(Continued)

(58) Field of Classification Search
None
See application file for complete search history.

(56) References Cited

U.S. PATENT DOCUMENTS 10,149,296 B1 * 12/2018 Noh ................. H04W 72/0453
2014/0307649 A1   10/2014 Vermani et al.
(Continued)

FOREIGN PATENT DOCUMENTS

WO    2015064943    5/2015

OTHER PUBLICATIONS

PCT International Application No. PCT/KR2015/013226, Written Opinion of the International Searching Authority dated Apr. 25, 2016, 16 pages.
(Continued)

*Primary Examiner* — Gregory B Sefcheck
*Assistant Examiner* — Suk Jin Kang
(74) *Attorney, Agent, or Firm* — Lee Hong Degerman Kang & Waimey

(57) ABSTRACT

A method for receiving a signal by a station in a wireless LAN system, according to an embodiment of the present invention, comprises the steps of: receiving one of a plurality of per channel SIG-Bs, comprised in a SIG-B field, via a first channel among the transmission bandwidth of a multi-user (MU) frame comprising SIG-B field and data; and receiving the data of the MU frame on a second channel differing from the first channel via which the per channel SIG-Bs have been received. Although any one of the plurality of per channel SIG-Bs is transmitted on the second channel, the data of the MU frame is received by means of the per channel SIG-Bs that are transmitted on the first channel instead of the per channel SIG-Bs that are transmitted on the second channel.

17 Claims, 18 Drawing Sheets

(51) Int. Cl.
*H04W 72/12* (2009.01)
*H04L 5/00* (2006.01)
*H04W 72/04* (2009.01)
*H04W 48/14* (2009.01)
*H04W 84/12* (2009.01)

(52) U.S. Cl.
CPC ......... *H04W 72/04* (2013.01); *H04W 72/121* (2013.01); *H04W 74/04* (2013.01); *H04L 5/0055* (2013.01); *H04W 48/14* (2013.01); *H04W 84/12* (2013.01)

(56) References Cited

U.S. PATENT DOCUMENTS

| | | | | |
|---|---|---|---|---|
| 2015/0365923 A1* | 12/2015 | Vermani | ............. | H04W 72/042 370/329 |
| 2016/0007325 A1* | 1/2016 | Seok | .................... | H04B 7/0452 370/329 |
| 2016/0007342 A1* | 1/2016 | Seok | .................... | H04B 7/0452 370/338 |
| 2016/0021667 A1* | 1/2016 | Kwon | .................... | H04L 5/0007 370/329 |
| 2016/0105836 A1* | 4/2016 | Seok | .................... | H04W 72/042 370/331 |
| 2016/0113009 A1* | 4/2016 | Seok | .................... | H04B 7/0452 370/329 |
| 2016/0143005 A1* | 5/2016 | Ghosh | ............... | H04W 52/0209 370/329 |
| 2016/0149727 A1* | 5/2016 | Hu | ..................... | H04L 25/0204 370/252 |
| 2016/0174200 A1* | 6/2016 | Seok | .................... | H04W 72/04 370/329 |
| 2016/0192351 A1* | 6/2016 | Kwon | ............... | H04W 72/0413 370/329 |
| 2016/0255610 A1* | 9/2016 | Li | ......................... | H04B 7/0413 370/329 |
| 2016/0286533 A1* | 9/2016 | Ghosh | ................... | H04L 5/0007 |
| 2016/0295513 A1* | 10/2016 | Moon | ................... | H04L 5/0023 |
| 2016/0295587 A1* | 10/2016 | Kwon | ................ | H04W 72/0446 |
| 2016/0315675 A1* | 10/2016 | Seok | .................... | H04B 7/0452 |
| 2016/0330058 A1* | 11/2016 | Chen | .................... | H04L 27/2607 |
| 2016/0330715 A1* | 11/2016 | Chen | .................... | H04L 27/2602 |
| 2016/0330718 A1* | 11/2016 | Kim | ....................... | H04L 5/0007 |
| 2016/0353322 A1* | 12/2016 | Li | ......................... | H04L 5/00 |
| 2017/0006608 A1* | 1/2017 | Josiam | ............. | H04W 72/0453 |
| 2017/0013092 A1* | 1/2017 | Chen | ...................... | H04L 5/003 |
| 2017/0201305 A1* | 7/2017 | Moon | .................. | H04B 7/0621 |
| 2017/0222769 A1* | 8/2017 | Li | ......................... | H04L 5/0023 |
| 2017/0338935 A1* | 11/2017 | Ahn | ...................... | H04L 5/0064 |
| 2018/0048427 A1* | 2/2018 | Lou | ...................... | H04L 1/0079 |
| 2018/0070336 A1* | 3/2018 | Ghosh | ................ | H04W 72/042 |
| 2018/0109362 A1* | 4/2018 | Seok | .................... | H04B 7/0452 |
| 2018/0152942 A1* | 5/2018 | Kwon | ................ | H04W 72/0446 |
| 2018/0198496 A1* | 7/2018 | Seok | .................... | H04B 7/0452 |
| 2018/0205510 A1* | 7/2018 | Kwon | .................. | H04L 5/0007 |
| 2018/0227913 A1* | 8/2018 | Seok | ................ | H04W 72/0446 |
| 2018/0359062 A1* | 12/2018 | Chen | ....................... | H04L 5/003 |

OTHER PUBLICATIONS

Kim, J. et al., "HE-SIG-B Structure", doc.: IEEE 802.11-15/0821r2, Jul. 2015, 19 pages.

Porat, R. et al., "SIG-B Encoding Structure", doc.: IEEE 802.11-15/0873r0, Jul. 2015, 13 pages.

Yunoki, K. et al., "Considerations on HE-SIG-A/B", doc.: IEEE 802.11-15/827r2, Jul. 2015, 14 pages.

* cited by examiner

FIG. 5
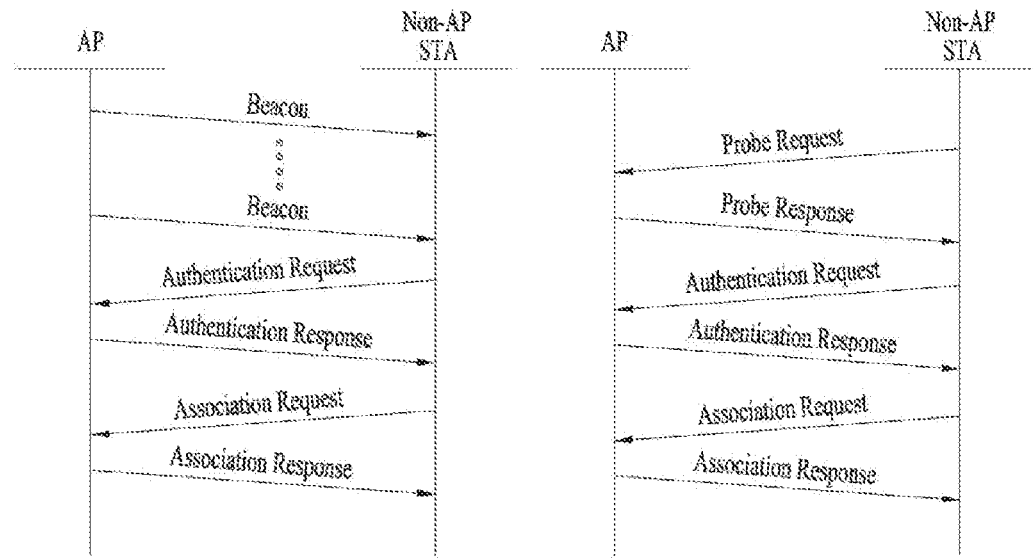
FIG. 6
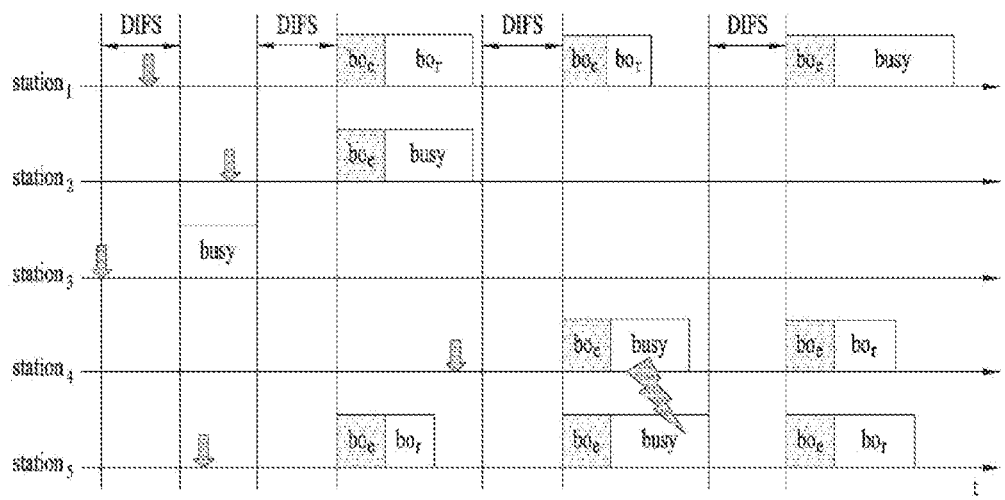

FIG. 14
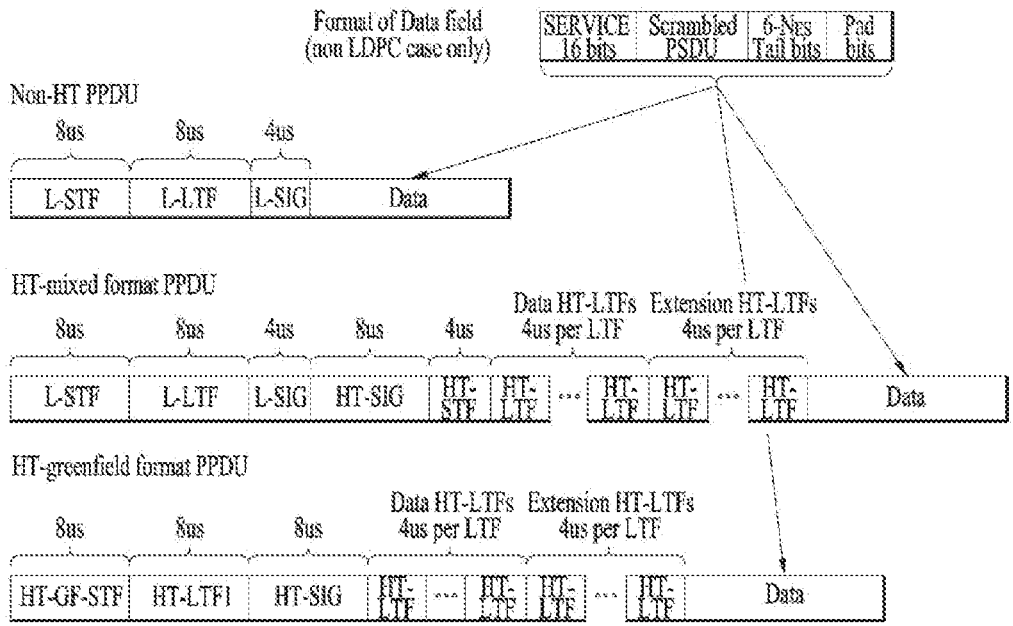
FIG. 15
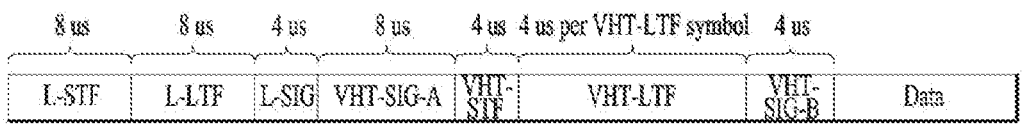
FIG. 16

FIG. 17

| Scrambler Initialization | | | | | | | Reserved SERVICE Bits | | | | | | | | |
|---|---|---|---|---|---|---|---|---|---|---|---|---|---|---|---|
| "0" | "0" | "0" | "0" | "0" | "0" | "0" | R | R | R | R | R | R | R | R | R |
| 0 | 1 | 2 | 3 | 4 | 5 | 6 | 7 | 8 | 9 | 10 | 11 | 12 | 13 | 14 | 15 |

Transmit Order →

| | B0 | B1 | B2 | B3 | B4 B9 | B10 B12 | B13 B15 | B16 B18 | B19 B21 | B22 | B23 |
|---|---|---|---|---|---|---|---|---|---|---|---|
| Composite Name: | BW | Reserved | STBC | Group ID | NSTS/Partial AID | | | | | TXOP_PS_NOT_ALLOWED | Reserved |
| SU Name: | | | | | SU NSTS | Partial AID | | | | | |
| MU Name: | | | | | MU[0] NSTS | MU[1] NSTS | MU[2] NSTS | MU[3] NSTS | | | |
| Bits: | 2 | 1 | 1 | 6 | 3 | 3 | 3 | 3 | | 1 | 1 |

(b)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | | | | | SU VHT-MCS | | | | Beam-formed | | | |
| MU Name: | | | | | MU[1] Coding | MU[2] Coding | MU[3] Coding | Reserved | Reserved | | | |
| Bits: | 1 | 1 | 1 | 1 | 1 | 1 | 1 | 1 | 1 | 1 | 8 | 6 |

FIG. 19
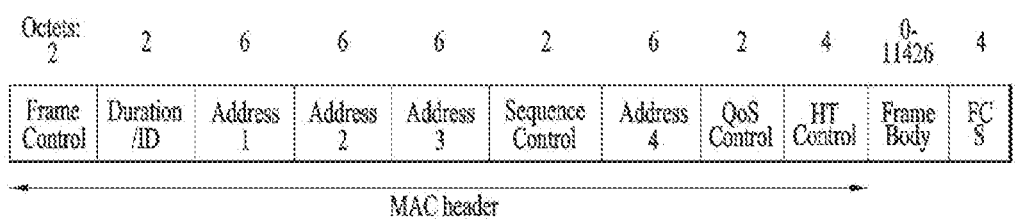
FIG. 20
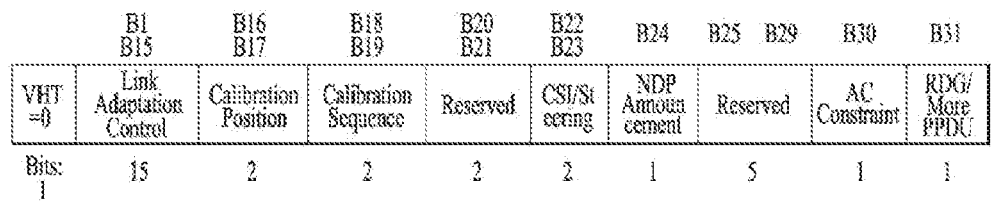
(a)
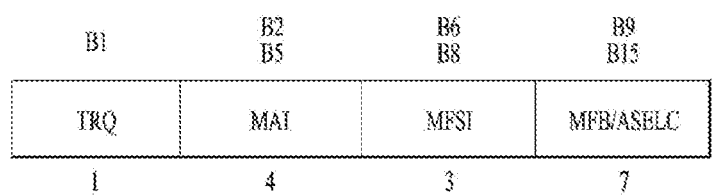
(b)

FIG. 21

| B1 | B2 | B3 B5 | B6 B8 | B9 B23 | B24 B26 | B27 | B28 | B29 | B30 | B31 |
|---|---|---|---|---|---|---|---|---|---|---|
| VHT=1 | Reserved | MRQ | MSI | MFSI/ GID-L | MFB | GID-H | Coding Type | FB Tx Type | Unsoli cited MFB | AC Constraint | RDG/ More PPDU |
| Bits: 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

| Frame Control | A1 | A2 | Sequence Control | A3 | A4 | Frame Body | FCS |
|---|---|---|---|---|---|---|---|
| Octets: 2 | 2 or 6 | 6 or 2 | 0 or 2 | 0 or 6 | 0 or 6 | variable | 4 |

(a)

| B0 B1 | B2 B4 | B5 B7 | B8 | B9 | B10 | B11 | B12 | B13 | B14 | B15 |
|---|---|---|---|---|---|---|---|---|---|---|
| Protocol Version | Type | PTID/ Subtype | From DS | More Fragm ents | Power Manage ents | More Data | Protected Frame | End of Service Period | Relayed Frame | Ack Policy |
| Bits: 2 | 3 | 3 | 1 | 1 | 1 | 1 | 1 | 1 | 1 | 1 |

(b)

FIG. 23B
40 MHz
80 MHz
160 MHz
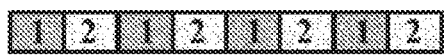

FIG. 27

| index | | | | | | | | | |
|---|---|---|---|---|---|---|---|---|---|
| 1 | 26 | 26 | 26 | 26 | 26 | 26 | 26 | 26 | 26 |
| 2 | 52 | | 26 | 26 | 26 | 26 | 26 | 26 | 26 |
| 3 | 26 | 26 | 52 | | 26 | 26 | 26 | 26 | 26 |
| 4 | 26 | 26 | 26 | 26 | 26 | 52 | | 26 | 26 |
| 5 | 26 | 26 | 26 | 26 | 26 | 26 | 26 | 52 | |
| 6 | 52 | | 52 | | 26 | 26 | 26 | 26 | 26 |
| 7 | 52 | | 26 | 26 | 26 | 52 | | 26 | 26 |
| 8 | 52 | | 26 | 26 | 26 | 26 | 26 | 52 | |
| 9 | 26 | 26 | 52 | | 26 | 52 | | 26 | 26 |
| 10 | 26 | 26 | 52 | | 26 | 26 | 26 | 52 | |
| 11 | 26 | 26 | 26 | 26 | 26 | 52 | | 52 | |
| 12 | 52 | | 52 | | 26 | 52 | | 26 | 26 |
| 13 | 52 | | 52 | | 26 | 26 | 26 | 52 | |
| 14 | 52 | | 26 | 26 | 26 | 52 | | 52 | |
| 15 | 26 | 26 | 52 | | 26 | 52 | | 52 | |
| 16 | 52 | | 52 | | 26 | 52 | | 52 | |
| 17 | 106 | | | | 26 | 26 | 26 | 26 | 26 |
| 18 | 106 | | | | 26 | 52 | | 26 | 26 |
| 19 | 106 | | | | 26 | 26 | 26 | 52 | |
| 20 | 106 | | | | 26 | 52 | | 52 | |
| 21 | 26 | 26 | 26 | 26 | 26 | 106 | | | |
| 22 | 52 | | 26 | 26 | 26 | 106 | | | |
| 23 | 26 | 26 | 52 | | 26 | 106 | | | |
| 24 | 52 | | 52 | | 26 | 106 | | | |
| 25 | 106 | | | | 26 | 106 | | | |
| 26 | 242 | | | | | | | | |

METHOD FOR TRANSMITTING AND RECEIVING SIGNAL IN WIRELESS LAN SYSTEM AND DEVICE FOR SAME

CROSS-REFERENCE TO RELATED APPLICATIONS

This application is the National Stage filing under 35 U.S.C. 371 of International Application No. PCT/KR2015/013226, filed on Dec. 4, 2015, which claims the benefit of U.S. Provisional Application No. 62/198,111, filed on Jul. 28, 2015, the contents of which are all hereby incorporated by reference herein in their entirety.

TECHNICAL FIELD

The present invention relates to a wireless LAN system, and more particularly, to a method for transmitting or receiving signals for multi-users in a wireless LAN system and a device for performing the same.

BACKGROUND ART

While a signal transmission method proposed below is applicable to various types of wireless communication, a Wireless Local Area Network (WLAN) system will be described as an exemplary system to which the present disclosure is applicable.

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention is to provide a method for efficiently transmitting or receiving resource allocation information for multi-users in a wireless LAN system.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for receiving a signal by a station (STA) in a wireless LAN system according to one aspect of the present invention comprises receiving one of a plurality of per channel SIG-Bs included in a SIG-B field, through a first channel among a transmission bandwidth of a multi-user (MU) frame including data and the SIG-B field; and receiving the data of the MU frame on a second channel different from the first channel through which the per channel SIG-B is received, wherein although any one of the plurality of per channel SIG-Bs is transmitted on the second channel, the data of the MU frame are received using the per channel SIG-B transmitted on the first channel instead of the per channel SIG-B transmitted on the second channel.

To achieve the object of the present invention, a station (STA) in a wireless LAN system according to another aspect of the present invention comprises a receiver receiving one of a plurality of per channel SIG-Bs included in a SIG-B field, through a first channel among a transmission bandwidth of a multi-user (MU) frame including data and the SIG-B field and receiving the data of the MU frame on a second channel different from the first channel through which the per channel SIG-B is received; and a processor controlling the receiver, wherein although any one of the plurality of per channel SIG-Bs is transmitted on the second channel, the data of the MU frame are received using the per channel SIG-B transmitted on the first channel instead of the per channel SIG-B transmitted on the second channel.

To achieve the object of the present invention, a method for transmitting a signal by an access point (AP) in a wireless LAN system according to other aspect of the present invention comprises transmitting one of a plurality of per channel SIG-Bs included in a SIG-B field, through a first channel among a transmission bandwidth of a multi-user (MU) frame including data of a station (STA) and the SIG-B field; and transmitting the data of the station on a second channel different from the first channel through which the per channel SIG-B is transmitted, wherein although any one of the plurality of per channel SIG-Bs is transmitted on the second channel, a resource of the data of the station is allocated using the per channel SIG-B transmitted on the first channel instead of the per channel SIG-B transmitted on the second channel.

Preferably, the plurality of per channel SIG-Bs included in the SIG-B field may be transmitted through channels different from each other.

More preferably, the number of the plurality of per channel SIG-Bs may be set differently from the number of the channels in accordance with a size of the transmission bandwidth.

Preferably, each of the plurality of per channel SIG-Bs may include multi-user common resource allocation information indicating resources allocated within a 20 MHz channel unit, and a user-specific channel indicator indicating a channel in which the allocated resources are located.

Preferably, the first channel may be paired with at least one channel as a first channel group, and the per channel SIG-B of the first channel may be transmitted repeatedly through the at least one channel paired with the first channel.

More preferably, the second channel may be paired with at least one channel different from the first channel as a second channel group, and the per channel SIG-B of the first channel may further include an indicator indicating whether the resource allocated to the first STA belongs to the first channel group or the second channel group.

Advantageous Effects

According to one embodiment of the present invention, a channel through which resource allocation information is transmitted and a channel where an allocated resource is located is configured differently from each other within a transmission bandwidth of multi-user frames, whereby load according to resource allocation may be distributed efficiently on the channels, and a field including resource allocation information may easily be aligned between the channels.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 5 is a diagram illustrating an active scanning and passive scanning method.

FIG. 6 is a diagram illustrating a Distributed Coordinated Function (DCF) mechanism in a WLAN system.

FIGS. 14 to 18 are diagrams illustrating an example of a frame structure used in an IEEE 802.11 system.

FIGS. 19 to 21 are diagrams illustrating an MAC frame format.

FIG. 22 is a diagram illustrating a short MAC frame format.

FIG. 23B is a diagram illustrating a HE-SIG-B field structure of HE PPDU.

FIG. 27 is a diagram illustrating a method for resource allocation according to one embodiment of the present invention.

MODE FOR INVENTION

Figure 1:
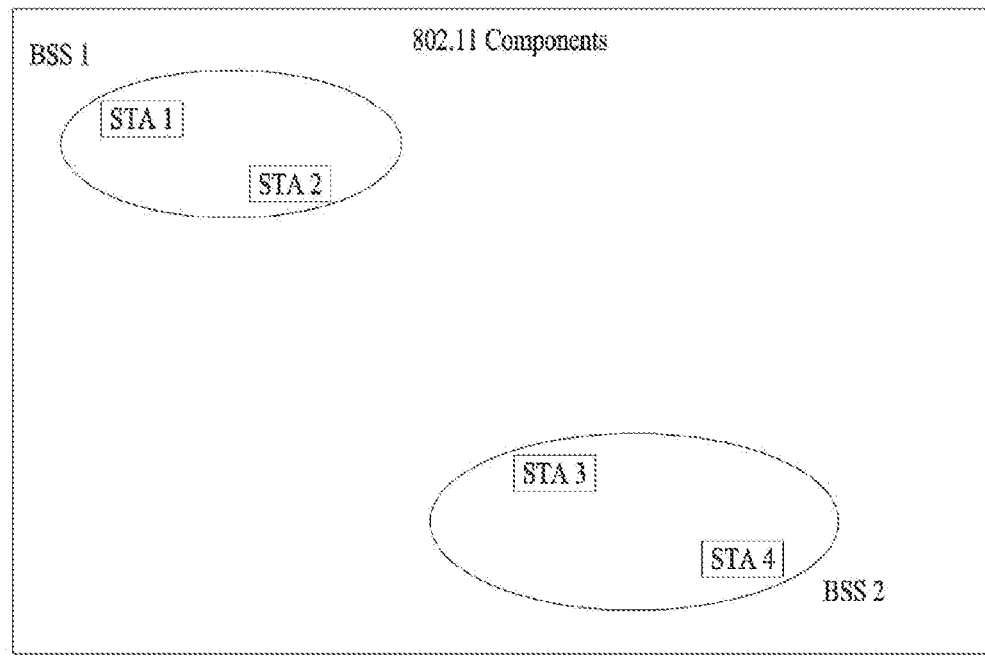
FIG. 1 is a diagram illustrating an exemplary configuration of a Wireless Local Area Network (WLAN) system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

In the present disclosure, a terminology, each of which includes such an ordinal number as 1st, 2nd and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as ' . . . unit', ' . . . part' corresponds to a unit for processing at least one or more functions or operations. The unit can be implemented by a combination of hardware and/or software.

FIG. 1 is a view illustrating an exemplary configuration of a Wireless Local Area Network (WLAN) system.

As depicted in FIG. 1, a wireless local area network includes at least one Basic Service Set (BSS). The BSS is a set of Stations (STA) capable of communicating with each other by successfully performing synchronization.

The STA is a logical entity including a physical layer interface for a Medium Access Control (MAC) and wireless media. The STA includes an Access Point (AP) and a Non-AP STA. A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a Distribution System (DS) via the wireless media. The AP can be called a concentrated controller, a Base Station (BS), a Node-B, a Base Transceiver System (BTS), a site controller, or the like.

The BSS can be divided into an infrastructure BSS and an Independent BSS (IBS 5).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
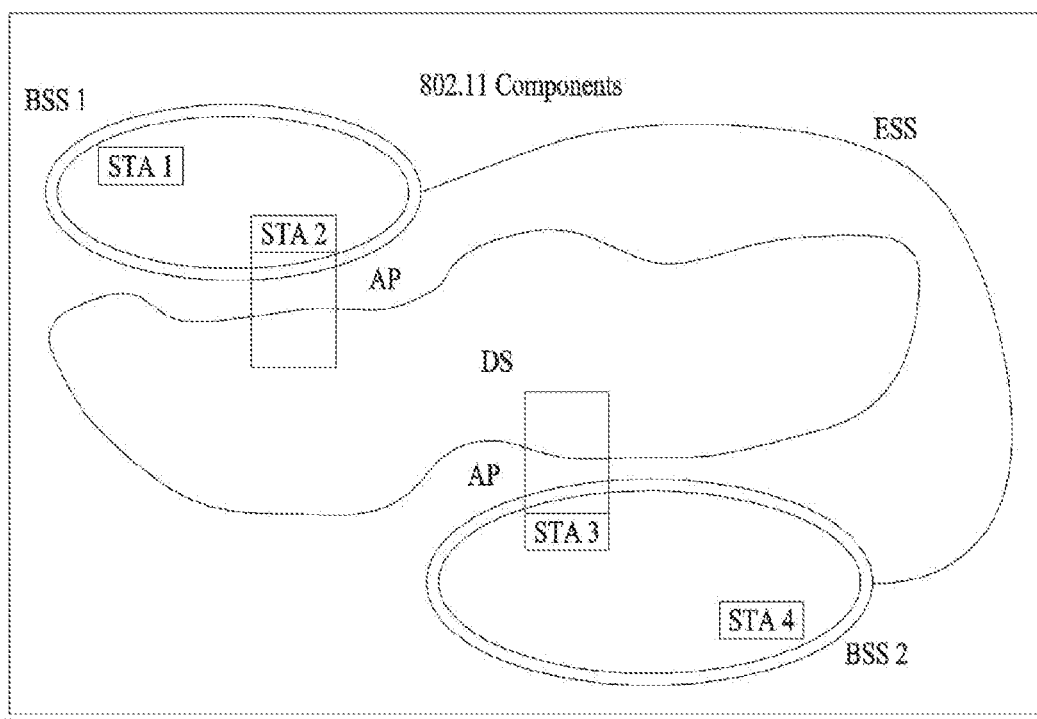
FIG. 2 is a diagram illustrating another exemplary configuration of a WLAN system.

FIG. 2 is a view illustrating another exemplary configuration of a WLAN system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
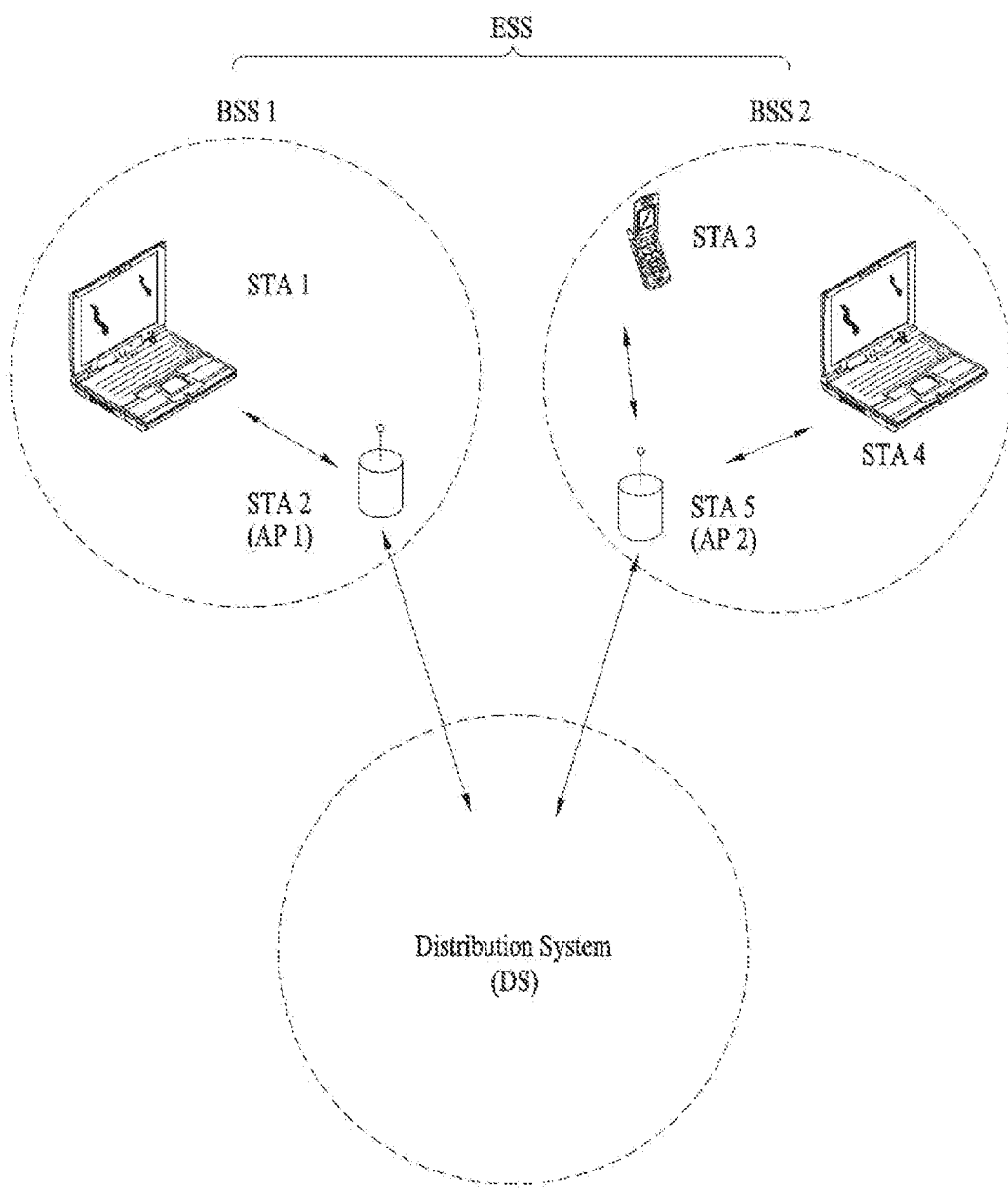
FIG. 3 is a diagram illustrating an exemplary structure of a WLAN system.

FIG. 3 is a view illustrating an exemplary structure of a WLAN system. In FIG. 3, an example of an infrastructure BSS including a DS is described.

Referring to an example of FIG. 3, ESS includes a BSS1 and BSS2. In a WLAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a Wireless Transmit/Receive Unit (WTRU), a User Equipment (UE), a Mobile Station (MS), a mobile terminal, a Mobile Subscriber Station (MSS), and the like. And, the AP corresponds to a Base Station (BS), a Node-B, an evolved Node-B (eNB), a Base Transceiver System (BTS), a femto BS, and the like.

Figure 4:
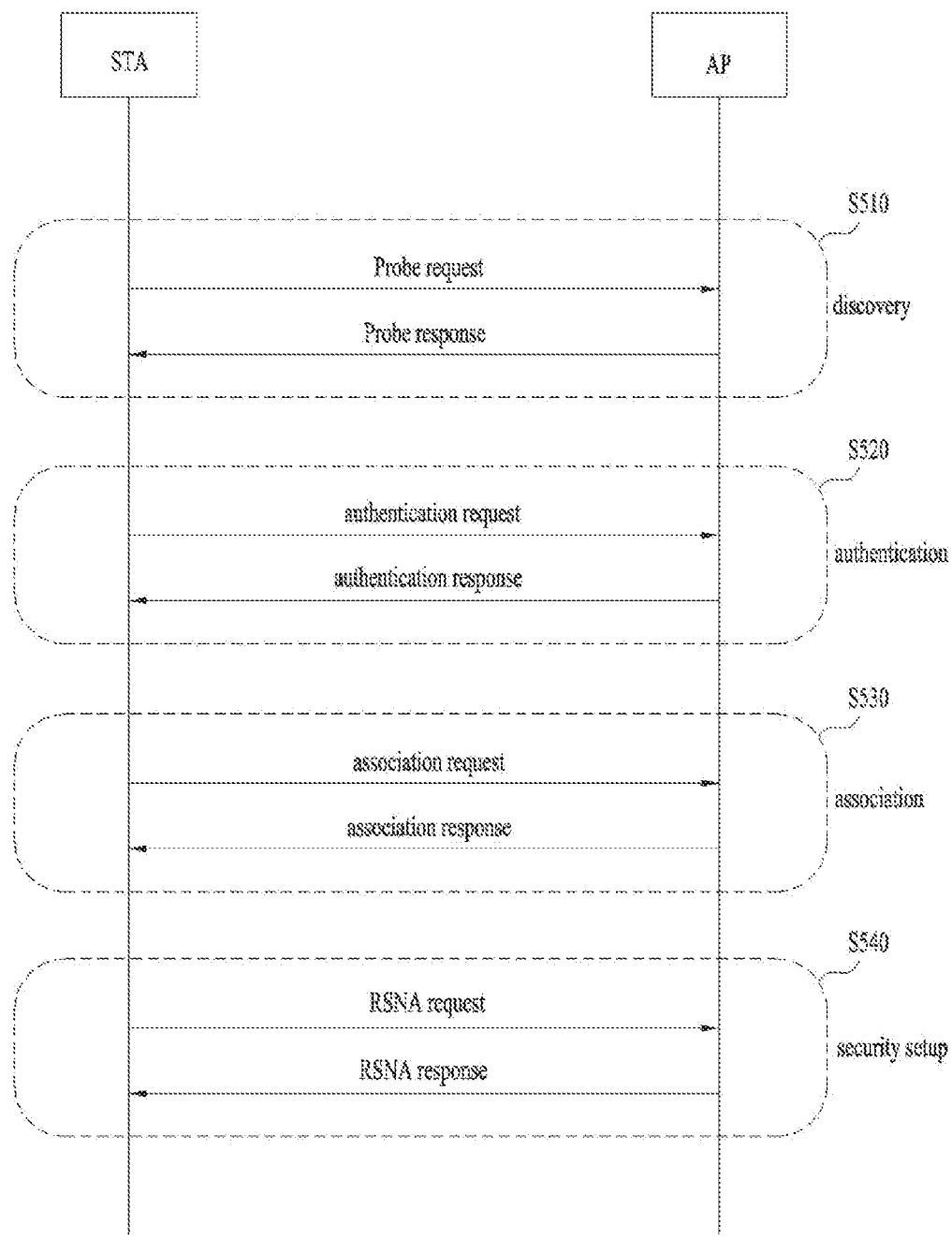
FIG. 4 is a diagram illustrating a link setup procedure in a WLAN system.

FIG. 4 is a flowchart illustrating a link setup procedure in a WLAN system, and FIG. 5 is a view illustrating an active scanning method and a passive scanning method.

In order for an STA to set up a link with a network and transceive data with the network, it is necessary for the station to discover the network, perform authentication, establish association, and pass through an authentication procedure for security. The link setup procedure can also be referred to as a session initiation procedure or a session setup procedure. And, discovery, authentication, association, and security setup procedures of the link setup procedure can be commonly called an association procedure.

An example of the link setup procedure is explained in the following with reference to FIG. 4.

In the step S410, an STA can perform a network discovery operation. The network discovery operation can include a scanning operation of the STA. In particular, in order for the STA to access a network, it is necessary for the STA to find out a network in which the STA is able to participate. The STA needs to identify a compatible network before participating in a wireless network. A procedure of identifying a network existing at a specific region is called scanning.

A scanning scheme includes active scanning and passive scanning. In FIG. 4, although a network discovery operation including an active scanning procedure is explained for example, an STA may operate with a passive scanning procedure.

According to the active scanning, a scanning performing STA transmits a probe request frame to a responder to discover an AP existing in the vicinity of the STA and waits for a response. The responder transmits a probe response frame to the STA, which has transmitted the probe request frame, in response to the probe request frame. In this case, the responder may correspond to an STA, which has lastly transmitted a beacon frame in a BSS on a channel being scanned. In the BSS, since an AP transmits a beacon frame, the AP becomes the responder. In an IBSS, since STAs in the IBSS alternately transmit a beacon, the responder is not fixed. For example, if an STA transmits a probe request frame on a channel 1 and receives a probe response frame on the channel 1, the STA stores BSS-related information included in the received probe response frame, moves to a next channel (e.g., a channel 2), and may be able to perform scanning (i.e., transmit and receive a probe request/response on the channel 2) using an identical method.

Referring to FIG. 5, scanning can also be performed by a passive scanning scheme. According to the passive scanning, a scanning performing STA waits for a beacon frame while switching a channel. A beacon frame is one of management frames in IEEE 802.11. The beacon frame is periodically transmitted to notify the existence of a wireless network and make the scanning performing STA discover and participate in the wireless network. In a BSS, an AP plays a role in periodically transmitting a beacon frame. In an IBSS, STAs belonging to the IBSS alternately transmit a beacon frame. Having received a beacon frame, the scanning performing STA stores information on the BSS included in the beacon frame and records beacon frame information on each channel while switching to a different channel. Having received a beacon frame, an STA stores BSS-related information included in the received beacon frame, moves to a next channel, and may be able to perform scanning on the next channel using an identical method.

When the active scanning and the passive scanning are compared, the active scanning has a merit in that delay is less and power consumption is lower compared to the passive scanning.

After the network is discovered by the STA, an authentication procedure can be performed in the step S420. In order to clearly distinguish the authentication procedure from a security setup operation of the step S440, the authentication procedure can be referred to as a first authentication procedure.

According to the authentication procedure, the STA transmits an authentication request frame to the AP and the AP transmits an authentication response frame to the STA in response to the authentication request frame. An authentication frame used in the authentication request/response corresponds to a management frame.

The authentication frame include information on an authentication algorithm number, an authentication transaction sequence number, a status code, a challenge text, a Robust Security Network (RSN), a finite cyclic group, and the like. The above-mentioned information is just an example of information capable of being included in the authentication request/response. The information can be replaced with different information or may further include additional information.

The STA can transmit the authentication request frame to the AP. The AP can determine whether to grant authentication on the STA based on the information included in the received authentication request frame. The AP can transmit a result of the authentication procedure to the STA via the authentication response frame.

If the STA is successfully authenticated, an association procedure can be performed in the step S430. According to the association procedure, the STA transmits an association request frame to the AP and the AP transmits an association response frame to the STA in response to the association request frame.

For example, the association request frame can include such information as information related to various capabilities, a beacon listening interval, an SSID (service set identifier), supported rates, supported channels, an RSN, a mobility domain, supported operating classes, a TIM (traffic indication map broadcast request), interworking service capability, and the like.

For example, the association response frame can include such information as information related to various capabilities, a status code, an Association ID (AID), supported rates, an Enhanced Distributed Channel Access (EDCA), a parameter set, a Received Channel Power Indicator (RCPI), a Received Signal to Noise Indicator (RSNI), a mobility domain, a timeout interval (association comeback time), an overlapped BSS scan parameter, TIM broadcasting response, QoS map, and the like.

The above-mentioned information is just an example of information capable of being included in the association request/response frame. The information can be replaced with different information or may further include additional information.

If the STA is successfully associated with the network, the security setup procedure can be performed in the step S540. The security setup procedure of the step S440 can also be referred to as an authentication procedure via an RSNA (robust security network association) request/response. The authentication procedure of the step S520 can be referred to as a first authentication procedure and the security setup procedure of the step S540 can be simply referred to as an authentication procedure.

For example, the security setup procedure of the step S440 may include a private key setup procedure via 4-way handshaking through an Extensible Authentication Protocol over LAN (EAPOL) frame. And, the security setup procedure can also be performed according to a security scheme not defined in IEEE 802.11 standard.

Based on the aforementioned discussion, a collision detection technique in a WLAN system is explained in the following.

As mentioned in the foregoing description, since various elements influence on a channel in wireless environment, a transmitting end is unable to precisely detect a collision. Hence, 802.11 has introduced a Distributed Coordination Function (DCF) corresponding to a Carrier Sense Multiple Access/Collision Avoidance (CSMA/CA) mechanism.

FIG. 6 is a view illustrating a DCF mechanism in a WLAN system.

A DCF performs Clear Channel Assessment (CCA) that senses a medium during a specific period (e.g., DIFS: DCF inter-frame space) before data is transmitted by STAs including data to be transmitted. In this case, if a medium is idle (available), an STA can transmit a signal using the medium. However, if a medium is busy (unavailable), an STA can transmit data after waiting for a period as much as a random backoff period in addition to a DIFS under an assumption that many STAs are waiting for the use of the medium. In this case, the random backoff period plays a role in avoiding a collision. If it is assumed that there are many STAs to transmit data, each of the STAs has a statistically different backoff interval value. Consequently, each of the STAs has different transmission timing. If an STA starts to transmit data using the medium, other STAs are unable to use the medium.

A random backoff time and a procedure are briefly explained in the following.

If a state of a specific medium is switched to idle from busy, a plurality of STAs start to prepare for data transmission. In this case, in order to minimize collision, each of a plurality of the STAs intending to transmit data selects a random backoff count and waits for slot time as much as the random backoff count. The random backoff count is a pseudo-random integer value and the value is selected from among values uniformly distributed in a range of [0 CW]. In this case, the CW stands for 'contention window'.

A CW parameter selects a CWmin value as an initial value. If transmission fails, the CWmin value becomes twice the initial value. For example, if it fails to receive an ACK response in response to a transmitted data frame, it may consider it as a collision. If a CW value has a CWmax value, the CWmax value is maintained until data transmission is succeeded. The CW value is reset to the CWmin value when the data transmission is succeeded. In this case, in order to conveniently implement and operate the CW, the CWmin, and the CWmax, it is preferable to configure the CW, the CWmin, and the CWmax to be maintained by 2n−1.

Meanwhile, if a random backoff procedure starts, an STA selects a random backoff count from among a range of [0 CW] and continuously monitors a medium while a backoff slot is countdown. If the medium is switched to a busy state, the STA temporarily stops countdown. If the medium is switched back to the idle, the STA resumes countdown of the backoff slot.

Referring to FIG. 6, many STAs intend to transmit data. In case of an STA 3, since a medium was idle as much as a DIFS, the STA 3 immediately transmits a data frame and the rest of STAs wait until the medium becomes idle. Since the medium was busy for a while, a plurality of STAs are waiting for a chance of using the medium. Hence, each of a plurality of the STAs selects a random backoff count. In this case, FIG. 6 shows a case that an STA 2, which has selected a smallest backoff count, transmits a data frame.

After the transmission of the STA 2 is finished, the medium becomes idle again and the STAs resume countdown for the temporarily stopped backoff interval. Referring to FIG. 6, although an STA 5, which has a next smallest random backoff count value and temporarily stopped countdown when the medium is busy, count downs the remaining backoff slot and transmits a data frame, it is overlapped with a random backoff count value of an STA 4 by chance. It is able to see that a collision occurs. In this case, since both the STA 5 and the STA 4 are unable to receive an ACK response in response to a transmitted data, the STAs select a random backoff count value again after CW is increased as much as twice.

As mentioned in the foregoing description, the most fundamental principle of the CSMA/CA is carrier sensing. A terminal is able to use physical carrier sensing and virtual carrier sensing to determine whether or not a DCF medium is busy/idle. The physical carrier sensing is performed at a PHY (physical layer) and the physical carrier sensing is performed through energy detection or preamble detection. For example, if it is determined as a receiving end has measured a power level or has read a preamble, it can be considered as a medium is busy. The virtual carrier sensing is performed by setting a Network Allocation Vector (NAV) to make other STAs not transmit data. The virtual carrier sensing is performed through a duration field value of a MAC header. Meanwhile, in order to reduce possibility of collision, a robust collision detection mechanism has been introduced. The reason for the introduction of the robust collision detection mechanism can be checked by two examples described in the following. For clarity, assume that a carrier sensing range is identical to a transmission range.

Figure 7:
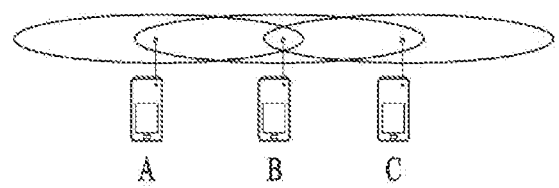
FIGS. 7 and 8 are exemplary diagrams describing problems encountered with a conventional collision resolution mechanism.
Figure 8:
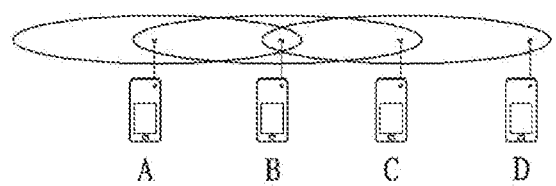

FIGS. 7 and 8 are view illustrating exemplary problems of a conventional collision resolution mechanism.

Specifically, FIG. 7 is a view illustrating hidden node issues. The present example shows a case that an STA A is communicating with an STA B and an STA C has information to be transmitted. Specifically, when the STA A transmits information to the STA B, since the STA C is out of transmission range of the STA A at the time of performing carrier sensing on a medium before transmitting data to the STA B, the STA C is unable to detect a signal transmitted by the STA A and there is a possibility that the medium is considered as being in an idle state. As a result, since the STA B receives information of the STA A and information of the STA C at the same time, a collision occurs. In this case, the STA A can be regarded as a hidden node of the STA C.

Meanwhile, FIG. 8 is a view illustrating exposed node issues. Currently, the STA B transmits data to the STA A. In this case, when the STA C performs carrier sensing, since the STA B is in a state of transmitting information, the carrier sensing shows a result that a medium is busy. As a result, although the STA C wants to transmit data to an STA D, since the media is sensed as busy, the STA C may unnecessarily wait until the medium becomes idle. In particular, although the STA A is located at the outside of a CS range of the STA C, the STA A may block information transmission of the STA C. In this case, the STA C becomes an exposed node of the STA B.

In order to make good use of a collision avoidance mechanism in the aforementioned situation, it may be able to introduce such a short signaling packet as RTS (request to send), CTS (clear to send), and the like. In particular, it may be able to use the short signaling packet to enable surrounding STAs to overhear whether or not two STAs transmit information. In particular, if an STA intending to transmit data transmits an RTS frame to an STA receiving the data, the receiving end STA can inform surrounding terminals that the receiving end STA is going to receive data by transmitting a CTS frame to the surrounding terminals.

Figure 9:
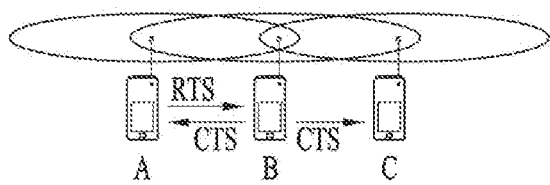
FIG. 9 is a diagram illustrating a mechanism of solving a hidden node issue using a Ready To Send (RTS)/Clear To Send (CTS) frame.

FIG. 9 is a diagram for explaining a mechanism of solving a hidden node issue using an RTS/CTS frame.

Referring to FIG. 9, both the STA A and the STA C intend to transmit data to the STA B. If the STA A sends RTS to the STA B, the STA B sends CTS to both the STA A and the STA C located near the STA B. As a result, the STA C waits until data transmission between the STA A and the STA B is finished. By doing so, it is able to avoid a collision.

Figure 10:
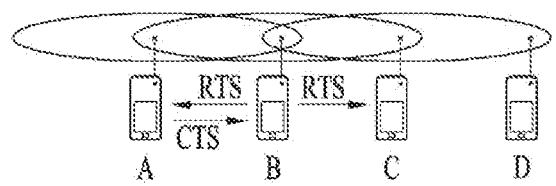
FIG. 10 is a diagram illustrating a mechanism of solving an exposed node issue using an RTS/CTS frame.

FIG. 10 is a view illustrating a mechanism of solving an exposed node issue using an RTS/CTS frame.

Referring to FIG. 10, the STA C overhears RTS/CTS transmission between the STA A and the STA B. By doing so, although the STA C transmits data to a different STA D, the STA C is able to know that a collision does not occur. In particular, the STA B transmits RTS to all terminals located near the STA B and transmits CTS to the STA A only to which data is to be practically transmitted. Since the STA C receives the RTS and does not receive the CTS of the STA A, the STA C is able to know that the STA A is located at the outside of a CS range of the STA C.

Figure 11:
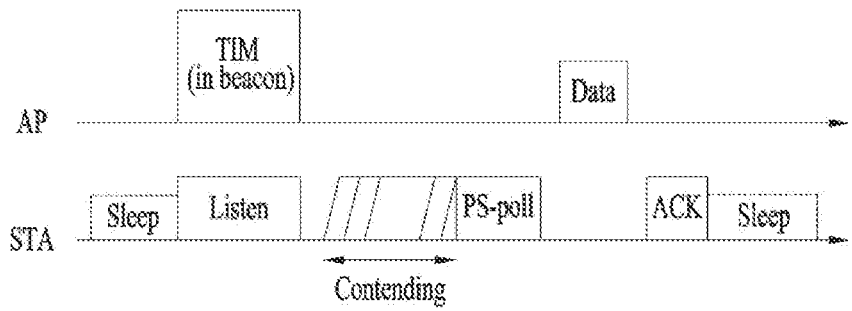
FIGS. 11 to 13 are detailed diagrams illustrating an operation of a station that has received TIM.
Figure 12:
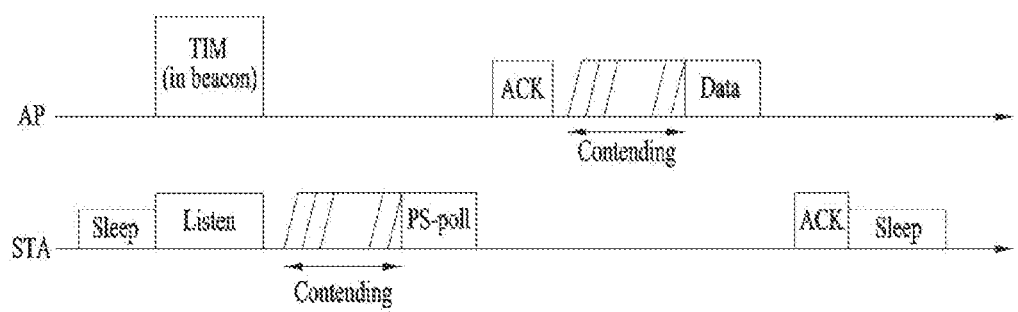
Figure 13:
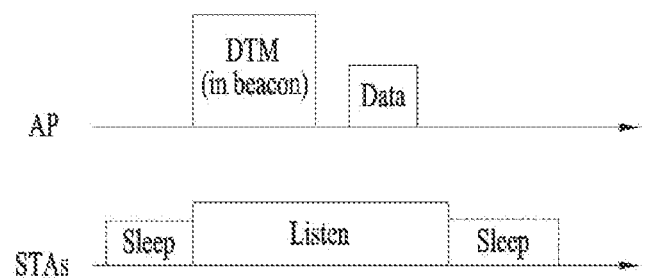

FIGS. 11 to 13 are views illustrating an operation of an STA which has received TIM.

Referring to FIG. 11, an STA switches to an awake state from a sleep state to receive a beacon frame including a TIM from an AP and interprets the received TIM element. By doing so, the STA is able to know there is a buffered traffic to be transmitted to the STA. The STA performs contending with other STAs to access a medium for transmitting a PS-poll frame and may be then able to transmit the PS-poll frame to request data frame transmission to the AP. Having received the PS-poll frame transmitted by the STA, the AP can transmit a frame to the STA. The STA receives a data frame and may be able to transmit a confirmation response (ACK) to the AP in response to the data frame. Subsequently, the STA can switch back to the sleep state.

As shown in FIG. 11, having received the PS-poll frame from the STA, the AP may operate according to an immediate response scheme that a data frame is transmitted after prescribed time (e.g., SIFS (short-inter-frame space)). Meanwhile, after the AP receives the PS-poll frame, if the AP fails to prepare a data frame to be transmitted to the STA during SIFS time, the AP may operate according to a deferred response scheme. Regarding this, it is explained in the following with reference to FIG. 12.

In the example shown in FIG. 12, similar to the example of FIG. 11, the STA switches to the awake state from the sleep state, receives a TIM from the AP, performs contending with other STAs, and transmits the PS-poll frame to the AP. If the AP fails to prepare a data frame during an SIFS after the PS-poll frame is received, the AP can transmit an ACK frame instead of the data frame to the STA. If the data frame is ready after the ACK frame is transmitted, the AP can transmit the data frame to the STA after contending is performed. The STA transmits an ACK frame to the AP to indicate that the data frame is successfully received and can switch back to the sleep state.

FIG. 13 illustrates an example in which the AP transmits a DTIM. Stations can switch to the awake state from the sleep state to receive a beacon frame including a DTIM element from the AP. Having received the DTIM, the STAs are able to know that a multicast/broadcast frame is to be transmitted. After the beacon frame including the DTIM is transmitted, the AP can immediately transmit data (i.e., the multicast/broadcast frame) without an operation of transmitting and receiving a PS-poll frame. Having received the beacon frame including the DTIM, the STAs receive data while continuously maintaining the awake state and may be able to switch back to the sleep state after the data reception is completed.

FIGS. 14 to 18 are views illustrating exemplary frame structures used in an IEEE 802.11 system.

An STA can receive a Physical Layer Convergence Protocol (PLCP) Packet Data Unit (PPDU). In this case, a PPDU frame format can be configured in a manner of including a Short Training Field (STF), a Long Training Field (LTF), a SIGnal (SIG) field, and a data field. In this case, as an example, the PPDU frame format can be configured based on a type of the PPDU frame format.

As an example, a non-High Throughput (non-HT) PPDU frame format can be configured by a Legacy-STF (L-STF) field, a Legacy-LTF (L-LTF) field, an SIG field, and a data field only.

And, the type of the PPDU frame format can be configured by either a HT-mixed format PPDU or a HT-greenfield format PPDU. In this case, the aforementioned PPDU format can further include an additional (a different type of) STF, LTF, and an SIG field between the SIG field and the data field.

Referring to FIG. 15, it may be able to configure a Very High Throughput (VHT) PPDU format. In this case, the VHT PPDU format can also further include an additional (a different type of) STF, LTF, and an SIG field between the SIG field and the data field. More specifically, the VHT PPDU format can include at least one of a VHT-SIG-A field, a VHT-STF field, a VHT-LTF field, and a VHT-SIG-B field between the L-SIG field and the data field.

In this case, the STF may correspond to a signal for signal detection, Automatic Gain Control (AGC), diversity selection, minute time synchronization, and the like. And, the LTF may correspond to a signal for channel estimation, frequency error estimation, and the like. In this case, both the STF and the LTF can be referred to as a PCLP preamble. The PCLP preamble may correspond to a signal for OFDM physical layer synchronization and channel estimation.

Referring to FIG. 16, the SIG field can include a RATE field, a LENGTH field, and the like. The RATE field can include information on modulation and a coding rate of a data. The LENGTH field can include information on a data length. In addition, the SIG field can include a parity bit, an SIG TAIL bit, and the like.

The data field can include a SERVIVE field, a PSDU (PLCP service data unit), a PPDU TAIL bit. If necessary, the data field can further include a padding bit.

In this case, referring to FIG. 17, a partial bit of the SERVICE field can be used for synchronization of a descrambler in a receiving end and a partial bit can be configured by a reserved bit. The PSDU corresponds to a MAC Protocol Data Unit (PDU) defined in a MAC layer and can include data generated/used in a higher layer. The PPDU TAIL bit can be used for returning an encoder to a zero state. The padding bit can be used for matching a length of a data field with a prescribed unit.

And, as mentioned in the foregoing description, the VHT PPDU format can include an additional (or a different type of) STF, LTF, and an SIG field. In this case, L-STF, L-LTF, and L-SIG may correspond to a part of non-VHT in the VHT PPDU. In this case, VHT-SIG A, VHT-STF, VHT-LTF, and VHT-SIG may correspond to a part of VHT in the VHT PPDU. In particular, a field for the non-VHT and a region for the VHT field can be respectively defined in the VHT PPDU. In this case, as an example, the VHT-SIG A can include information for interpreting the VHT PPDU.

In this case, as an example, referring to FIG. 18, the VHT-SIG A can be configured by VHT SIG-A1 (FIG. 18 (a)) and VHT SIG-A2 (FIG. 18 (b)). In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] coding field, an LDPC extra OFDM symbol field, an SU VHT-MCS/MU[1-3] coding field, a beamformed field, a CRC field, a tail field, and a reserved field. Through the aforementioned fields, it may be able to check information on the VHT PPDU.

FIGS. 19, 20, and 21 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 19, the MAC header may include Frame Control, Duration/ID, Addresses, Sequence Control, QoS Control, and HT Control. In the MAC header, the Frame Control field may include control information required for frame transmission/reception. The Duration/ID field may be set to a time required to transmit the frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 20 and 21, a VHT subfield of the HT Control field may indicate whether the HT Control field is the HT-variant type or the VHT-variant type. For example, if the VHT subfield is set to '0', the HT Control field may be the HT-variant type, and if the VHT subfield is set to '1', the HT Control field may be the VHT-variant type.

For example, referring to FIG. 20, if the HT Control field is the HT-variant type, the HT Control field may include Link Adaptation Control, Calibration Position, Calibration Sequence, CSI/Steering, HT NDP Announcement, AC constraint, RDG/More PPDU, and Reserved fields. For example, referring to (b) of FIG. 20, the Link Adaptation Control field may include TRQ, MAI, MFSI, and MFB/ASELC. For more details, refer to the IEEE 802.11 standard specifications.

For example, referring to FIG. 21, if the HT Control field is the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved fields. For example, referring to (b) of FIG. 21, the MFB field may include VHT N_STS, MCS, BW, and SNR.

FIG. 22 is a view illustrating a Short MAC frame format. A MAC frame may be configured as a Short MAC frame by reducing unnecessary information when needed, to prevent waste of radio resources. For example, referring to FIG. 22, the MAC header of a Short MAC frame may always include a Frame Control field, an A1 field, and an A2 field. The MAC header may selectively include a Sequence Control field, an A3 field, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field of the Frame Control field in the MAC header may be 3 bits with value 0 to value 3 providing address information and value 4 to value 7 being reserved. New address information may be provided using the reserved values in the present disclosure, which will be described later.

In the Frame Control field of the MAC header, the From DS field may be 1 bit.

Each of the More Fragment, Power Management, More Data, Protected Frame, End of Service Period, Relayed Frame, and Ack Policy fields may be configured in 1 bit. The Ack Policy field may provide ACKnowledgement/Negative ACKnowledgement (ACK/NACK) information in 1 bit.

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in an awake state. The AP VHT STA may switch the non-AP VHT STA to a doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

- A VHT MU PPDU is received, and the STA is not indicated as a group member by an RXVECTOR parameter, Group_ID.
- An SU PPDU is received, and an RXVECTOR parameter, PARTIAL_AID is not 0 or does not match the partial AID of the STA.
- Although the STA determines that the RXVECTOR parameter, PARTIAL_AID matches the partial AID of the STA, a receiver address of the MAC header does not match the MAC address of the STA.
- Although the RXVECTOR parameter, Group_ID indicates that the STA is a group member, an RXVECTOR parameter, NUM_STS is set to 0.
- A VHT NDP Announcement frame is received, and the RXVECTOR parameter, PARTIAL_AID is set to 0 and does not match the AID of an Info field for the STA.
- The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to the non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

HE PPDU

Figure 23A:
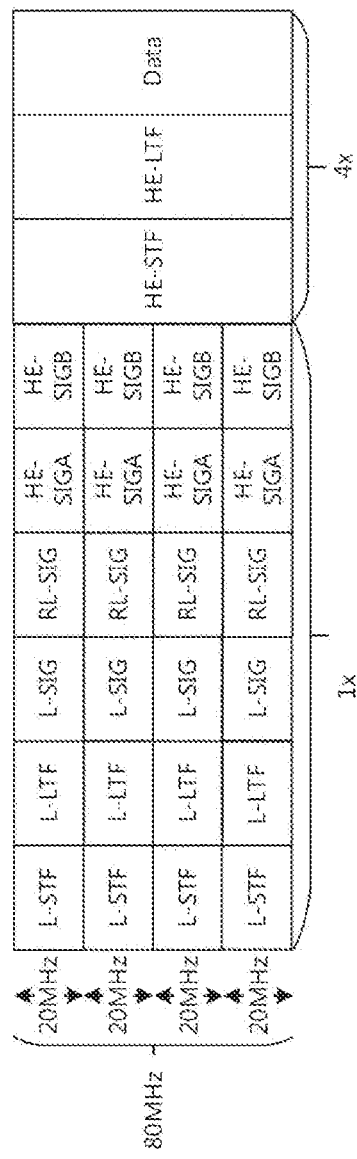
FIG. 23A is a diagram illustrating an example of a high efficiency (HE) PPDU format.

FIG. 23A is a diagram illustrating an example of a high efficiency (HE) PPDU format. The HE PPDU format may be used on the IEEE 802.11ax system. As described above, since the type of the PPDU format may be set in various manners, the scope of the present invention is not limited to the HE PPDU of FIG. 23A. For convenience of description, although FIG. 23 illustrates a HE PPDU format set in a unit of 20 MHz on a bandwidth of 80 MHz, the HE PPDU may be transmitted on a bandwidth of 20 MHz, 40 MHz or 160 MHz.

Referring to FIG. 23A, the HE PPDU includes L part (L-STF, L-LTF, L-SIG, RL-SIG) and HE part (HE-SIG-A, HE-STF, HE-LTF, HE-SIG-B). L-STF, L-LTF, L-SIG, RL-SIG, HE-SIG-A and HE-SIG-B may be set in a unit of 1× symbol (3.2 us), and HE-STF, HE-LTF and Data may be set in a unit of 4× symbol (12.8 us).

In the L part, a legacy preamble is transmitted. The L part may be transmitted in a frequency domain in a unit of 20 MHz. If a bandwidth is greater than 20 MHz, the L part may be transmitted by duplication in a unit of 20 MHz. L-SIG includes packet length information. RL-SIG is a field where L-SIG is repeatedly transmitted to improve reliability of L-SIG.

HE-SIG-A may be transmitted in a unit of 20 MHz in the same manner as the L part. If a bandwidth is greater than 20 MHz, HE-SIG-A may be transmitted by duplication in a unit of 20 MHz. HE-SIG-A may include common control information of multi-users. Contents of common control information included in HE-SIG-A may be determined depending on the type of the PPDU. For example, in case of SU PPDU, HE-SIG-A may include at least one of a format indicator, a TXOP duration, a BSS color field, a DCM (dual carrier modulation) indicator, a UL/DL flag, a bandwidth, a payload GI (guard interval), a PE, a MCS, coding, LTE compression, NSTS (Number of Spatial Streams), STBC, beamforming, CRC (cyclic redundancy check), and a Tail field. In case of MU DL PPDU, HE-SIG-A may include at least one of a format indicator, a TXOP duration, a BSS color field, a DCM indicator, the number of HE-SIG-B field symbols, MCS of HE-SIG-B field, CRC and Tail field. Also, in case of MU UL PPDU, HE-SIG-A may include at least one of a format indicator, a TXOP duration, a BSS color field, a DCM indicator, CRC and Tail field. The aforementioned types of information of the HE-SIG-A field may be joint-encoded.

Figure 24:
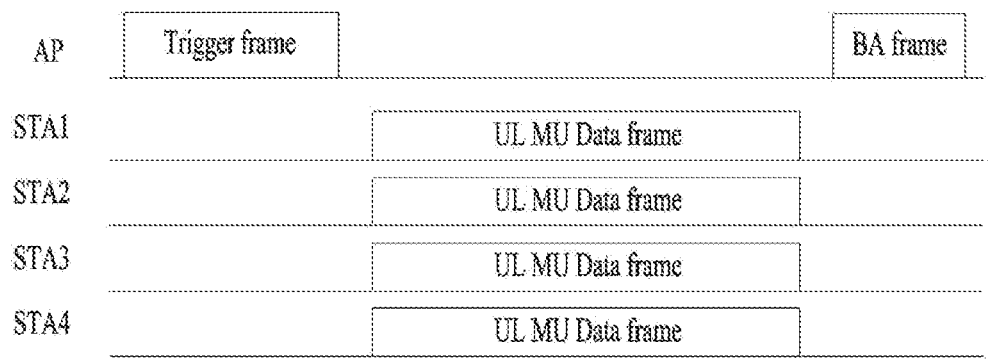
FIG. 24 is a diagram illustrating a method for performing uplink multi-user (UL MU) transmission in an AP station and a non-AP station.

FIG. 23B is a diagram illustrating a HE-SIG-B field structure of HE PPDU. FIG. 24 illustrates, but not limited to, bandwidths of 40 MHz, 80 MHz and 160 MHz, and the HE-SIG-B field may be transmitted in a unit of 20 MHz. The number of OFDM symbols of the HE-SIG-B field is varied.

If the bandwidth is not greater than 20 MHz, one HE-SIG-B field is transmitted.

If the bandwidth is greater than 20 MHz, each of channels of 20 MHz transmit any one of an odd type HE-SIG-B and an even type HE-SIG-B. For example, the odd type HE-SIG-B and the even type HE-SIG-B may be transmitted alternately. The odd numbered 20 MHz channel transmits the odd type HE-SIG-B, and the even numbered 20 MHz channel transmits the even type HE-SIG-B. In more detail, in case of 40 MHz bandwidth, the odd type HE-SIG-B is transmitted on the first 20 MHz channel, and the even type HE-SIG-B is transmitted on the second 20 MHz channel. In case of 80 MHz bandwidth, the odd type HE-SIG-B is transmitted on the first 20 MHz channel, the even type HE-SIG-B is transmitted on the second 20 MHz channel, the same odd type HE-SIG-B is repeatedly transmitted on the third 20 MHz channel, and the same even type HE-SIG-B is repeatedly transmitted on the fourth 20 MHz channel. Similarly, transmission is performed even in case of 160 MHz.

In this way, HE-SIG-B may be transmitted repeatedly as the size of the bandwidth is increased. The HE-SIG-B which is repeatedly transmitted may be transmitted by frequency hopping as much as 20 MHz from the 20 MHz channel through which the same type HE-SIG-B is transmitted.

Meanwhile, contents of each of the odd type HE-SIG-B may be different from those of each of the even type HE-SIG-B. However, the odd type HE-SIG-B fields have the same contents. Likewise, the even type HE-SIG-B fields have the same contents.

According to one embodiment, the odd type HE-SIG-B may be configured to include only resource allocation information on odd numbered 20 MHz channels, and the even type HE-SIG-B may be configured to include only resource allocation information on even numbered 20 MHz channels. Unlike this embodiment, according to another embodiment of the present invention, the odd type HE-SIG-B may include resource allocation information on at least a part of the even numbered 20 MHz channels, and the even type HE-SIG-B may include resource allocation information on at least a part of the odd numbered 20 MHz channels.

The HE-SIG-B may include user specific information. For example, the user specific information may include, but not limited to, at least one of station AID, resource allocation information (e.g., allocation size), MCS per STA for DL-OFDMA PPDU, NSTS, coding, STBC and transmission beamforming information.

In more detail, the HE-SIG-B may include a common field and a user specific field. The common field may be prior to the user specific field. The common filed includes information on all of STAs designated to receive PPDU at a corresponding bandwidth. The common field may include resource unit allocation information. The same common field is applied between the odd type HE-SIG-Bs. Likewise, the same common field is applied between the even type HE-SIG-Bs. For example, when four 20 MHz channels constituting 80 MHz are divided into LL, LR, RL and RR, a common block for LL and RL may be included in the common field of the odd type HE-SIG-B, and a common block for LR and RR may be included in the common field of the even type HE-SIG-B.

The user specific field may include a plurality of sub fields. The sub fields may include information specific for individual STA designated to receive PPDU. The common field and the user specific field may be identified from each other in a unit of bit not OFDM symbol.

Figure 23C:
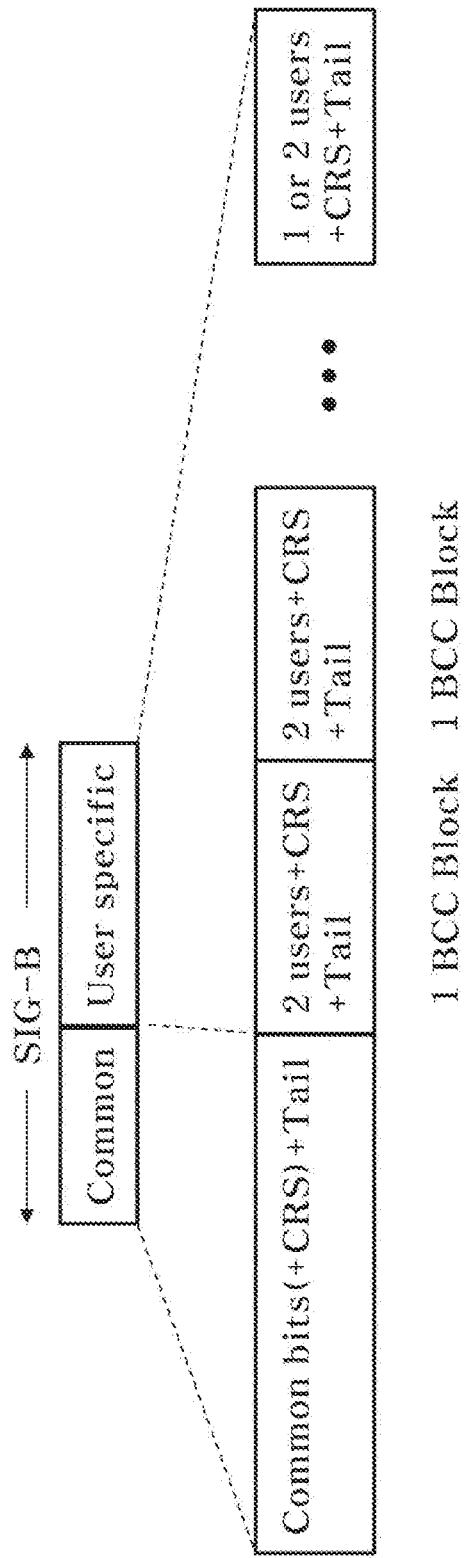
FIG. 23C is a diagram illustrating an encoding structure of HE-SIG-B.

FIG. 23C illustrates an encoding structure of HE-SIG-B according to one embodiment of the present invention. Referring to FIG. 23C, information on 2 users is joint-encoded per BCC block excluding the last BCC (Binary Convolution Code) in the user specific field. The joint-encoded information on the users may include, but not limited to, at least one of STA ID, information (e.g., NSTS, transmission beamforming, MCS and Coding) on single user allocation of RU, and each user information (e.g., Spatial Configuration field, MCS, Coding) on multi-user allocation of RU.

Meanwhile, according to still another embodiment of the present invention, information on 3 or more users may be joint-encoded. Also, attachment of CRC may be performed per user, user group, or block. Also, CRC may be attached or omitted to the common block in accordance with the embodiment.

Also, although FIG. 23C illustrates that user information is not included in the common block, according to further still another embodiment, user information may be included in the common block such that the common block may have the same size as that of the other BCC block.

MU Transmission

FIG. 24 is a diagram illustrating a method for performing uplink multi-user (UL MU) transmission in an AP station and a non-AP station.

As described above, the AP may transmit a signal by acquiring TXOP accessible to a medium and reserving the medium through contention. At this time, referring to FIG. 24, the AP station may transmit a trigger frame to a plurality of stations to perform UL MU transmission. At this time, as an example, the trigger frame may include a resource allocation position and size as UL MU allocation information, IDs of stations, MCS, MU type (=MIMO, OFDMA), etc. That is, the AP station may be a frame that transmits a trigger frame to a plurality of stations to allow the plurality of stations to perform uplink data transmission. At this time, as an example, the plurality of stations may transmit data to the AP, after the passage of SIFS, on the basis of a format indicated by the trigger frame. Afterwards, the AP may transmit ACK/NACK information to the station, whereby UL MU transmission may be performed.

Figure 25:
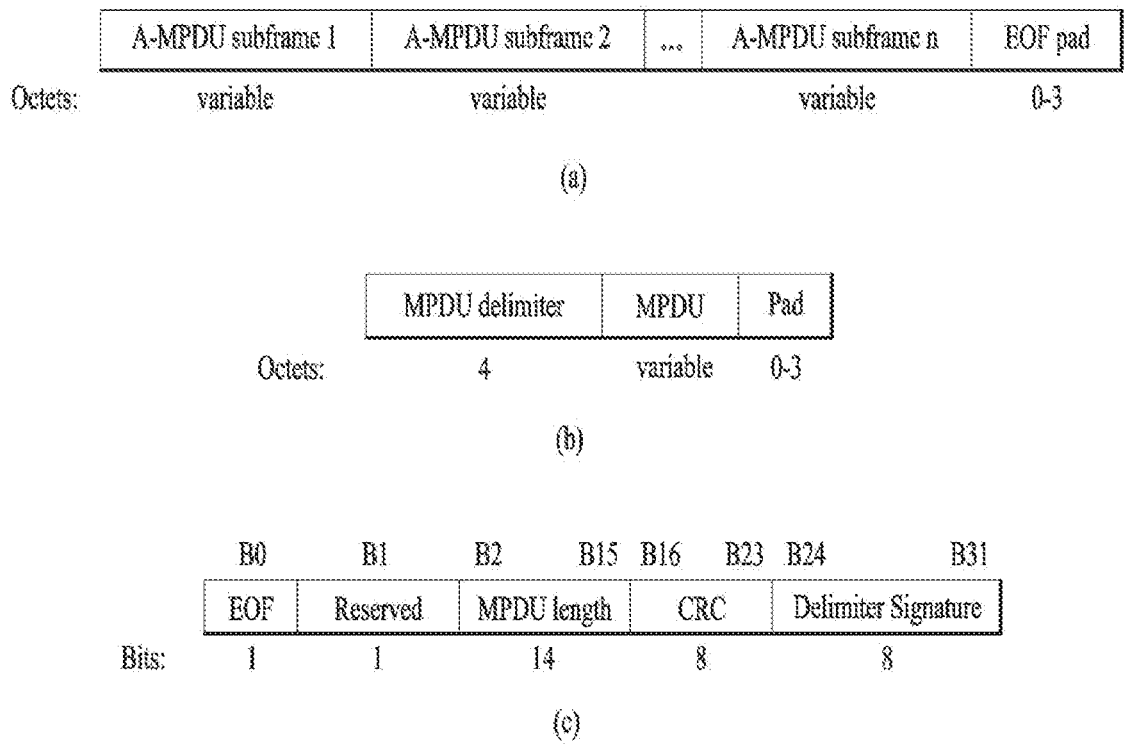
FIG. 25 is a diagram illustrating an A-MPDU (Aggregate-MPDU) frame structure for UL MU transmission.

FIG. 25 is a diagram illustrating an A-MPDU (Aggregate-MPDU) frame structure for UL MU transmission. In UL MU transmission, a plurality of stations may perform data transmission at the same time by respectively receiving their resource allocation information. To this end, an A-MPDU format may be used. In more detail, referring to FIG. 25(a), the A-MPDU may include a plurality of A-MPDU subframe fields and EOF (End of Frame) pad fields. At this time, information on each of the plurality of stations may be delivered through each A-MPDU subframe. At this time, as an example, referring to FIG. 25(b), the A-MPDU subframe may include an MPDU delimiter, MPDU and PAD fields. Also, as an example, referring to FIG. 25(c), the MPDU delimiter field may include EOF, MPDU length, CRC, Delimiter Signature and Reserved fields.

For example, the EOF field may include 1 bit. At this time, the EOF field may be a field indicating whether the corresponding subframe is the last of the frame. At this time, as an example, the A-MPDU subframe of which MPDU length field is set to 0 and EOF is set to 1 cannot be arranged prior to another A-MPDU subframe of which EOF is set to 0. That is, the A-MPDU subframe of which MPDU length field is set to 0 and EOF is set to 1 may be the last A-MPDU subframe of the frame.

Also, the MPDU length field may be a field indicating a length of MPDU. At this time, if the MPDU length field is set to 0, MPDU may not exist. Also, as an example, the A-MPDU subframe of which MPDU length field is set to 0 may be used to indicate start or end frame.

Also, the Delimiter Signature field may be formed in an independent pattern to search for MPDU delimiter. That is, the Delimiter Signature field may be a field used to identify each A-MPDU subframe.

Hereinafter, the term STA may mean non-AP STA unless specially limited.

In the IEE 802.11ax, the AP may transmit and receive a signal to and from multiple users on the basis of OFDMA or MU-MIMO.

Figure 26:
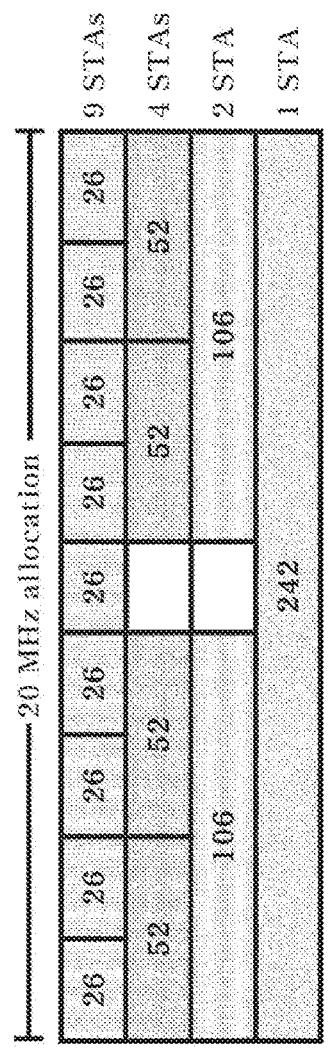
FIG. 26 is a diagram illustrating resources available at 20 MHz channel in case of signal transmission based on OFDMA.

FIG. 26 is a diagram illustrating resources available at 20 MHz channel in case of signal transmission based on OFDMA. Each numbers in blocks means the number of tones (e.g., subcarriers).

Referring to FIG. 26, in case of signal transmission based on the smallest chunk (e.g., 26 tones), STAs up to maximum 9 may be supported. In case of MU-MIMO, STAs up to maximum 8 may be supported.

Meanwhile, unlike the MU OFDAM scheme in which different users are allocated to different chunks, the MU MIMO scheme in which different users share resources within the corresponding chunk may be supported when a chunk size is 106 tones or more.

Resource Allocation Through HE-SIG-B Field

In the IEEE 802.11ax system, if a signal is transmitted to a plurality of users using OFDMA and MU-MIMO, HE-SIG-B information (hereinafter, 'per 20 MHz HE-SIG-B') per 20 MHz channel, which is transmitted through HE-SIG-B field, may be configured independently in a unit of 20 MHz channel. If a system bandwidth exceeds 20 MHz, the number of symbols required for per 20 MHz HE-SIG-B transmission may be varied in a unit of 20 MHz. For example, the number of symbols required for transmission of per 20 MHz HE-SIG-B may be varied depending on the number of STAs allocated to the corresponding 20 MHz channel. In this way, if the number of symbols required for transmission of per 20 MHz HE-SIG-B is varied per 20 MHz channel, it is difficult to time-align per 20 MHz HE-SIG-Bs of a plurality of 20 MHz channels, and it is difficult to optimize load balancing between the respective 20 MHz channels within the HE-SIG-B field.

Hereinafter, a method for efficiently aligning per 20 MHz HE-SIG-Bs transmitted independently in a unit of 20 MHz channel, for example, a method for efficiently allocating resources to load balancing of HE-SIG-B field will be described.

If there is big difference in the number of STAs allocated per 20 MHz channel, for example, if 9 STAs area allocated to one 20 MHz channel and 3 STAs are allocated to the other 20 MHz channels, a length difference of per 20 MHz HE-SIG-B symbols between 20 MHz channels is increased. Therefore, if per 20 MHz HE-SIG-Bs of 20 MHz channels are aligned, overhead of HE-SIG-B is increased. For example, if it assumed that a length of per 20 MHz HE-SIG-B of 20 MHz channel 1 is X and a length of per 20 MHz HE-SIG-B of 20 MHz channel 2 is Y (X>>Y), predetermined bits should be padded in per 20 MHz HE-SIG-B of 20 MHz channel 2, redundancy should be added, or an MCS level lower than a level required for 20 MHz channel 2 should be set.

According to one embodiment of the present invention, by reducing overhead of HE-SIG-B field signaling and considering load balancing of the HE-SIG-B field, HE-SIG-B information (hereinafter, 'per user HE-SIG-B') for individual STA may be transmitted through another channel not the channel through which data of the corresponding STA is allocated. For example, although STA receives per user HE-SIG-B of 20 MHz channel 1, data resources allocated by the received per user HE-SIG-B may be located in the 20 MHz channel 2. The STA may receive data in the 20 MHz channel 2.

In this way, if per user HE-SIG-B information is transmitted using another 20 MHz channel not the 20 MHz channel allocated to the STA, a resource allocation method for indicating resources allocated to the STA will be described.

Hereinafter, indexes of the embodiments are only intended to assist understanding of the present invention, and the scope of the present invention is not restricted by the order of the indexes and even embodiments having different indexes may be combined.

First Embodiment

According to one embodiment of the present invention, per user HE-SIG-B information on STA may be transmitted full flexibly within a system bandwidth.

For example, if HE-SIG-B field is transmitted using 80 MHz system bandwidth, for load balancing within the HE-SIG-B field and alignment of per 20 MHz HE-SIG-Bs, per user HE-SIG-B information on STA may be transmitted using one of three 20 MHz channels not the 20 MHz channel through which data resources of the STA are allocated.

Therefore, methods for configuring resource allocation information to indicate that resource allocated by the per user HE-SIG-B information transmitted to the STA is another 20 MHz channel not the 20 MHz channel through which the per user HE-SIG-B information is transmitted will be suggested.

According to one embodiment of the present invention, a channel indicator indicating 20 MHz channel, in which resource allocated to the STA is located, through which data are transmitted, may be included in user-specific information of HE-SIG-B. For example, it is assumed that a system bandwidth is 80 MHz. In this case, since four 20 MHz channels exist in this system bandwidth, a channel through which resource of the STA is allocated may be indicated using the channel indicator having a 2-bit size. However, a size of the channel indicator may be varied depending on a size of the system bandwidth, or may be set by assuming a maximum system bandwidth (e.g., 160 MHz) (e.g., 3-bit).

Information, which is transmitted per 20 MHz and indicates the resource allocated to the STA, may include resource allocation information transmitted using a common part of HE-SIG-B and a channel indicator transmitted per STA.

FIG. 27 illustrates resource allocation patterns within 20 MHz channel according to one embodiment of the present invention. Referring to FIG. 27, a total of 26 resource allocation patterns are illustrated but are intended for convenience of description, and other resource allocation patterns may be added or only some of 26 patterns may be used.

According to resource allocation pattern #1, 26 subcarriers (i.e., tones) are allocated to each STA. Therefore, according to resource allocation pattern #1, resource may be allocated to maximum 9 STAs at a corresponding 20 MHz channel. According to resource allocation pattern #2, 52 subcarriers are allocated to one STA, and 26 subcarriers are allocated to 7 STAs. According to resource allocation pattern #3, a resource area of STA to which 52 subcarriers are allocated is shifted as much as 52 subcarriers on a frequency axis. In this way, a plurality of resource allocation patterns different from one another may be defined.

(i) According to one embodiment of the present invention, a size of resource allocation information of STA, which is transmitted using a common part of HE-SIG-B, may be determined based on the number of resource allocation patterns. For example, the resource allocation information may be set to 5-bit considering indexes of 26 resource allocation patterns shown in FIG. 27. In this case, information including a channel indicator (e.g., 2-bit) in a user-specific part and resource allocation information (e.g., 5-bit) of a common part is transmitted per 20 MHz channel, wherein the channel indicator indicates 20 MHz channel allocated to the STA.

Therefore, a size of the resource allocated to each STA may be identified using the resource allocation information included in the per 20 MHz HE-SIG-B transmitted per 20 MHz channel, and the 20 MHz channel in which the corresponding resource is actually located may be identified using the channel indicator of the per user HE-SIG-B.

(ii) The resource allocation information according to another embodiment of the present invention may be set to a bitmap. For example, the resource allocation information may be transmitted using a bitmap that includes bits corresponding to each of the number (e.g., 26, 52, 106, and 242) of subcarriers available within the 20 MHz channel.

Meanwhile, since the channel indicator of the 20 MHz channel through which the resource of the STA is allocated is transmitted through the per user HE-SIG-B information, resource allocation information transmitted per 20 MHz channel may be configured differently per 20 MHz channel.

(iii) According to another embodiment of the present invention, resources of the same size may be allocated to STAs within the 20 MHz channel to reduce overhead caused by signaling of the resource allocation information. For example, resource units set to any one of 26 subcarriers, 52 subcarriers and 106 subcarriers may be allocated to each STA. If the sizes of the resource units may be set to any one of 26 subcarriers, 52 subcarriers and 106 subcarriers, the resource allocation information may be set to minimum 4-bit to indicate whether the resource units have been set to which one of three different sizes. Therefore, the resources allocated to the STA may be signaled by the resource allocation information (e.g., 4-bit) and the channel indicator (e.g., 2-bit). For reference, in this embodiment, it is assumed that 242 subcarriers are not allocated to a single resource unit in the OFDMA mode. Therefore, the resource allocation information may be set to 4-bit. However, according to still another embodiment of the present invention, the resource units may be set to various sizes.

According to the resource allocation schemes as above, the 20 MHz channel through which the per 20 MHz HE-SIG-B is transmitted and the channel through which data are transmitted may be configured differently from each other, and the per 20 MHz HE-SIG-Bs may be configured to include per user HE-SIG-B for the same number of STAs or substantially equivalent number of STAs. Therefore, the per 20 MHz HE-SIG-Bs may be aligned, and load balancing of the HE-SIG-B field is optimized, whereby overhead may be reduced.

(iv) According to still another embodiment of the present invention, each of the resource allocation information and the channel indicator are not transmitted to the STA, and resource allocation information for a full bandwidth may be transmitted to the STA by depending on a bandwidth used by the STA for transmission.

For example, if a 40 MHz bandwidth is used for transmission, each 20 MHz channel may transmit resource allocation information for a full bandwidth. In the aforementioned embodiments, since the resource allocation information on the 20 MHz channel is set to 5-bit, the resource allocation information on the full bandwidth of 40 MHz may be set to 5-bit*2=10-bit, or 9-bit resource allocation information may be transmitted per 20 MHz channel considering the number of allocations. At this time, per user HE-SIG-Bs for STAs within the HE-SIG-B field may be transmitted sequentially in accordance with the resource allocation order.

Although the 40 MHz bandwidth is exemplarily used in this embodiment, the present invention is not limited to this example. For example, resource allocation information for bandwidth of 80 MHz or 160 MHz may be transmitted similarly.

Meanwhile, since allocation information on a system bandwidth is transmitted through the common part of the HE-SIG-B field, the aforementioned channel indicator may be omitted from the per user HE-SIG-B.

Second Embodiment

According to one embodiment of the present invention, load balancing may be performed for 20 MHz channel through another 20 MHz channel. For example, per user HE-SIG-B for STA of 20 MHz channel may be transmitted through a neighboring 20 MHz channel.

(i) According to one embodiment, two different 20 MHz channels or more may be subjected to pairing. That is, 20 MHz channel 1 and 20 MHz channel 2 may be subjected to pairing such that the 20 MHz channel 2 may transmit HE-SIG-B information to STA allocated to the 20 MHz channel 1. The 20 MHz channels subjected to pairing may be adjoin each other or spaced apart from each other at a certain offset on a frequency axis.

For example, if a bandwidth of 80 MHz is used, the 20 MHz channel 1 and the 20 MHz channel 2 may be subjected to pairing and 20 MHz channel 3 and 20 MHz channel 4 may be subjected to pairing, whereby HE-SIG-B transmission for load balancing may be performed. That is, for alignment of the per 20 MHz HE-SIG-Bs, the 20 MHz channel 1 and the 20 MHz channel 2 may transmit per user HE-SIG-B of STA to which a data resource is allocated at its 20 MHz channel through 20 MHz channel paired therewith. In this embodiment, it is assumed that two 20 MHz channels are subjected to pairing. However, according to another embodiment, the 20 MHz channels 1 to 4 may be set to one pairing set. Also, the number of 20 MHz channels which belong to a pairing set may be determined in accordance with a system bandwidth. For example, although two 20 MHz channels are set to one pairing set at a system bandwidth of 80 MHz, 4 20 MHz channels may be set to one pairing set at a system bandwidth of 160 MHz. Meanwhile, pairing may be performed only if a system bandwidth exceeds a certain size. For example, if the system bandwidth is 40 MHz or less, pairing of 20 MHz channels may not be performed.

Next, a method for transmitting resource allocation information when 20 MHz channels are subjected to pairing will be described.

The resource allocation information on 20 MHz channel may commonly be transmitted through per 20 MHz HE-SIG-Bs. The resource allocation information on a plurality of STAs may be transmitted per STA order on a time axis. A channel indicator (e.g., 1-bit) indicating whether the resource allocation information on each STA indicates a resource allocated to 20 MHz channel through which corresponding per 20 MHz HE-SIG-B is transmitted or indicates a resource allocated to paired 20 MHz channels may be configured. The channel indicator may be transmitted through per user HE-SIG-B in per 20 MHz HE-SIG-B. Therefore, the per 20 MHz HE-SIG-B may include resource allocation information (e.g., 5-bit) transmitted from a common part and a channel indicator (e.g., 1-bit) transmitted through a user-specific part.

Meanwhile, resources of the same size may be allocated to STAs within 20 MHz channel to reduce overhead according to resource allocation. For example, resources may be allocated to STAs by only a resource unit size of any one of 26 subcarriers, 52 subcarriers, and 106 subcarriers. In this case, the resource allocation information of per 20 MHz HE-SIG-B may be set to 4-bit. Therefore, the resource allocated to the STA may be signaled to the resource allocation information (e.g., 4-bit) and the channel indicator (e.g., 1-bit).

According to another embodiment, resource allocation information on the paired 20 MHz channels may be transmitted through the common part of the per 20 MHz HE-SIG-Bs. For example, if the 20 MHz channel 1 and the 20 MHz channel 2 are paired at a bandwidth of 80 MHz, the resource allocation information of per 20 MHz HE-SIG-B transmitted through the 20 MHz channel 1 may be configured equally to the resource allocation information of per 20 MHz HE-SIG-B transmitted through the 20 MHz channel 2. The resource allocation information of per 20 MHz HE-SIG-B transmitted through each 20 MHz channel may indicate resources allocated to 40 MHz bandwidth that includes the paired 20 MHz channels. As a result, although the STA receives per 20 MHz HE-SIG-B at the 20 MHz channel 1, data resources may be allocated to the STA at the 20 MHz channel 2. In this case, the resource allocation information of the common part may include information (e.g., 5-bit) indicating resources allocated to the 20 MHz channel 1 and information (e.g., 5-bit) indicating resources allocated to the 20 MHz channel 2. At this time, the per user HE-SIG-Bs of the STAs may be transmitted in accordance with the allocated order of resources.

Meanwhile, the resources of the same size may be allocated to the STAs within the 20 MHz channel to reduce overhead according to resource allocation. For example, resources may be allocated to STAs by only a resource unit size of any one of 26 subcarriers, 52 subcarriers, and 106 subcarriers. In this case, the resource allocation information of per 20 MHz HE-SIG-B include resource allocation information (e.g., 4-bit) on the 20 MHz channel 1 and allocation information (e.g., 4-bit) on the 20 MHz channel 2.

Pairing of the 20 MHz channels exemplarily described as above is intended for convenience of description, but the present invention is not limited to this example. For example, a pairing structure of {a first 20 MHz channel, a third 20 MHz channel} and {a second 20 MHz channel and a fourth 20 MHz channel} or a pairing structure of {a first 20 MHz channel, a fourth 20 MHz channel} and {a second 20 MHz channel, a third 20 MHz channel} at a bandwidth of 80 MHz and may be configured.

Third Embodiment

According to one embodiment of the present invention, HE-SIG-B field may be transmitted in accordance with a hybrid structure of a scheme in which per 20 MHz HE-SIG-B is configured independently per 20 MHz channel and a scheme in which per 20 MHz HE-SIG-B is configured equally for all 20 MHz channels.

For example, in case of a bandwidth of 40 MHz or more, the HE-SIG-B field may be transmitted using the structure described in FIG. 23B.

A structure at a bandwidth of 40 MHz is set to [1 2], and the respective 20 MHz channels include their respective information different from each other.

A structure at a bandwidth of 80 MHz is set to [1 2 1 2], and the structure at 40 MHz is repeatedly enlarged to 80 MHz. The first 20 MHz channel is repeated at the third 20 MHz channel. Users allocated to each of the first 20 MHz channel and the third 20 MHz channel are signaled together. The fourth 20 MHz channel is also similar to the third 20 MHz channel.

A structure at a bandwidth of 160 MHz is set to [1 2 1 2 1 2 1 2], and the structure at 80 MHz is repeatedly enlarged to 160 MHz.

In this embodiment, the resource allocation information of per 20 MHz HE-SIG-B transmitted at the 20 MHz channel includes resource allocation information on another 20 MHz channel through which corresponding per 20 MHz HE-SIG-B is repeatedly transmitted. For example, if the bandwidth of 80 MHz is used, the per 20 MHz HE-SIG-B transmitted at the first 20 MHz channel is repeatedly transmitted at the third 20 MHz channel. Therefore, the resource allocation information transmitted through the common part of HE-SIG-B of the first 20 MHz channel includes information on the first 20 MHz channel and the third 20 MHz channel. For example, the resource allocation information transmitted through the common part of HE-SIG-B may be configured as follows.

If a resource allocation pattern of the 20 MHz channel shown in FIG. 27 is used, resource allocation information on two 20 MHz channels may be set to 5-bit*2=10-bit. Therefore, if the bandwidth of 80 MHz is used, the size of the resource allocation information transmitted through the per 20 MHz HE-SIG-B may be set to 10-bit. Since per 20 MHz HE-SIG-B at the bandwidth of 80 MHz is repeated at the bandwidth of 160 MHz, one per 20 MHz HE-SIG-B includes resource allocation information on four 20 MHz channels. Therefore, the resource allocation information on four 20 MHz channels may be set to 5-bit*4=20-bit.

Meanwhile, if resource units having the same size are allocated as shown in FIG. 26, 4-bit is required to indicate resource allocation for one 20 MHz channel. Therefore, if the bandwidth of 80 MHz is used, the size of resource allocation information transmitted through per 20 MHz HE-SIG-B may be set to 4-bit*2=8-bit. Since per 20 MHz HE-SIG-B at the bandwidth of 80 MHz is repeated at the bandwidth of 160 MHz, one per 20 MHz HE-SIG-B includes resource allocation information on four 20 MHz channels. Therefore, the resource allocation information on four 20 MHz channels may be set to 4-bit*4=16-bit.

In the resource allocation based on FIG. 26 or 27, resource allocation information within per 20 MHz HE-SIG-B may be configured in the order of the 20 MHz channels. For example, if the bandwidth of 80 MHz is used, in the resource allocation information of per 20 MHz HE-SIG-B transmitted through the first 20 MHz channel, per 20 MHz resource allocation information on the first 20 MHz channel may first be located, and then per 20 MHz resource allocation information on an Nth (e.g., the third) 20 MHz channel may be located. Therefore, the STA may identify a position of a resource allocated thereto on the basis of the per 20 MHz resource allocation information and the order of per user HE-SIG-B. Therefore, the channel indicator indicating the 20 MHz channel in which the resource allocated to the STA is located may be omitted. For example, if allocation of first 9 per 20 MHz resources is related to 20 MHz channel 1 and allocation of next 9 per 20 MHz resources is related to 20 MHz channel 2, and per-user HE-SIG-B of the STA is located at the 15th channel, the STA may identify that its resource has been allocated to the 20 MHz channel 2 even there is no channel indicator.

In another embodiment, a corresponding indicator may indicate whether the resource allocated by the per user HE-SIG-B transmitted to the STA is located in a first group channel (e.g., the first 20 MHz channel and the third 20 MHz channel at the bandwidth of 80 MHz) or a second group channel (e.g., the second 20 MHz channel and the fourth 20 MHz channel at the bandwidth of 80 MHz). Therefore, as the corresponding indicator may be used, the 20 MHz channel through which per user HE-SIG-B is transmitted and the 20 MHz channel in which the resource allocated by the per user HE-SIG-B is located may be configured differently from each other. The corresponding indicator may be set to 1-bit and transmitted through the per user HE-SIG-B.

Figure 28:
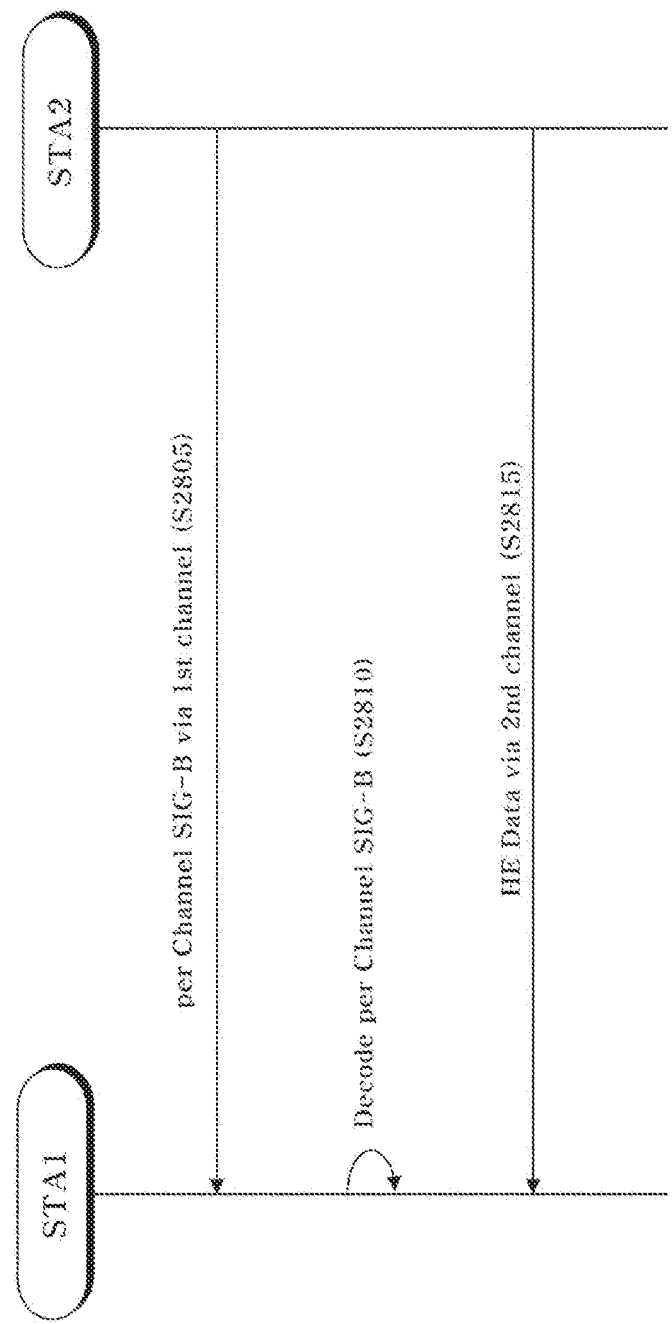
FIG. 28 is a diagram illustrating a flow of a method for transmitting and receiving a signal according to one embodiment of the present invention.

FIG. 28 is a diagram illustrating a flow of a method for transmitting and receiving a signal according to one embodiment of the present invention. Repeated description of the aforementioned embodiments will be omitted. Hereinafter, it is assumed that a first STA is a non-AP STA and a second STA is an AP STA. However, this is only intended for convenience of description, and the first STA may be an AP STA, or the second STA may be a non-STA. Also, although the first STA and the second STA are only shown so as not to cloud the issue, it will be apparent to those skilled in the art that the other STAs for transmitting and receiving MU frame may exist.

Referring to FIG. 28, the first STA receives per channel SIG-B through a channel 1 (S2805). For example, the first STA receives one of a plurality of per channel SIG-Bs included in SIG-B field through channel 1 of the SIG-B field and a transmission bandwidth of MU (multi-user) frame including data. The transmission bandwidth of the MU frame may be 40 MHz, 80 MHz or 160 MHz. The plurality of per channel SIG-Bs may be the aforementioned per 20 MHz HE-SIG-Bs.

The plurality of per channel SIG-Bs included in the SIG-B field may be transmitted through channels different from each other. At this time, the number of per channel SIG-Bs may be set differently from the number of channels in accordance with the size of the transmission bandwidth of the MU frame. For example, when the transmission bandwidth of the MU frame is 40 MHz, 80 MHz or 160 MHz, the number of 20 MHz channels may be set to 2, 4 or 8. However, the number of per channel SIG-Bs may be set to 2 when the transmission bandwidth of the MU frame is 40 MHz, 80 MHz or 160 MHz (e.g., odd type HE-SIG-B, even type HE-SIG-B).

The first STA decodes the received per channel SIG-B (S2810). Each of the plurality of per channel SIG-Bs may include at least one of resource allocation information indicating resources allocated within a 20 MHz channel unit and a channel indicator indicating a channel in which the allocated resources are located. The resource allocation information may be located in the common part of the SIG-B field, and the channel indicator may be located in a user-specific part of the SIG-B field.

The first STA receives its data included in the MU frame on channel 2 different from channel 1 on the basis of the per channel SIG-B (S2815). For example, although any one of the plurality of per channel SIG-Bs is transmitted even on the channel 2, data of the MU frame may be received using the per channel SIG-B transmitted at the channel 1 instead of the per channel SIG-B transmitted at the channel 2.

Meanwhile, the channel 1 may be paired with at least one another channel as a first channel group. The per channel SIG-B of the channel 1 may be transmitted repeatedly through another channel paired with the channel 1.

Also, the channel 2 may be paired with another channel different from the channel 1 as a second channel group. The per channel SIG-B of the channel 1 may further include an indicator indicating whether the resource allocated to the first STA belongs to the first channel group or the second channel group.

Figure 29:
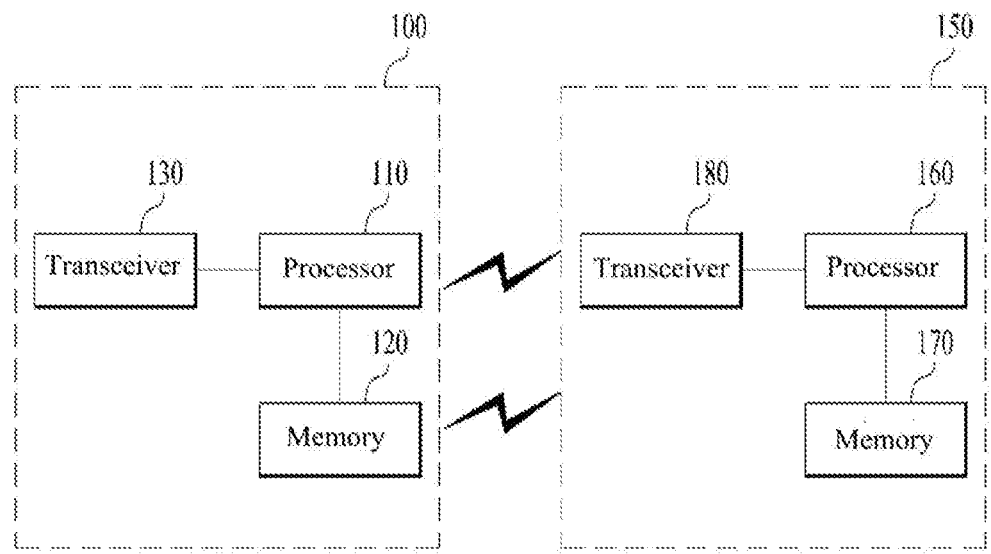
FIG. 29 is a block diagram illustrating an exemplary configuration of an AP device (or base station) and a station device (or UE).

FIG. 29 is a block diagram illustrating exemplary configurations of an AP (or BS) and an STA (or UE).

An AP 100 may include a processor 110, a memory 120, and a transceiver 130. An STA 150 may include a processor 160, a memory 170, and a transceiver 180.

The transceivers 130 and 180 may transmit and receive wireless signals, for example, implement the PHY layer in an IEEE 802 system. The processors 110 and 160 may be connected to the transceivers 130 and 180, and implement the PHY layer and/or the MAC layer in the IEEE 802 system. The processors 110 and 160 may be configured to perform one or a combination of two or more of the foregoing various embodiments of the present disclosure. Further, modules that perform AP and STA operations according to the foregoing various embodiments of the present invention may be stored in the memories 120 and 170 and executed by the processors 110 and 160. The memories 120 and 170 may be included inside the processors 110 and 160, or may be installed outside the processors 110 and 160 and connected to the processors 110 and 160 by known means.

The above descriptions of the AP 100 and the STA 150 are applicable to a BS and a UE, respectively in other wireless communication systems (e.g., an LTE/LTE-A system).

The above specific configurations of an AP and an STA may be implemented in such a manner that the various embodiments of the present disclosure may be implemented independently or simultaneously in a combination of two or more of them. Redundant descriptions will not be provided herein, for clarity.

Figure 30:
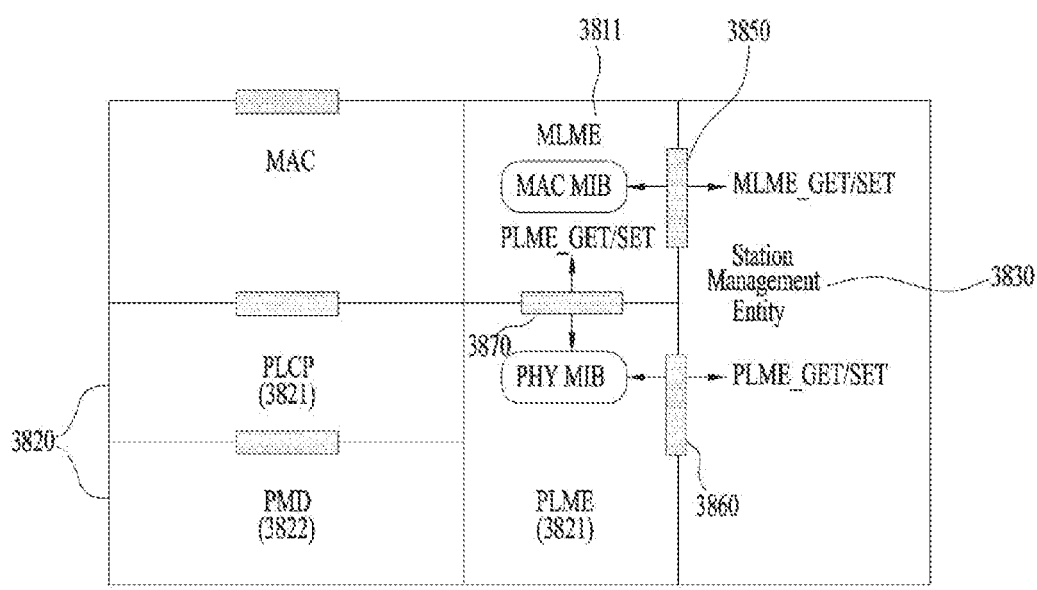
FIG. 30 is a diagram illustrating an exemplary structure of a processor of an AP device or a station device.

FIG. 30 is a view illustrating an exemplary structure of a processor in an AP or STA according to an embodiment of the present disclosure.

The processor of the AP or STA may have a multi-layered structure. FIG. 30 focuses on a MAC sublayer 3810 of a Data Link Layer (DLL) and a PHY layer 3820 among a plurality of layers. Referring to FIG. 30, the PHY layer 3820 may include a PLCP entity 3821, and a Physical Medium Dependent (PMD) entity 3822. Each of the MAC sublayer 3810 and the PHY layer 3820 includes a management entity conceptually called MAC sublayer Management Entity (MLME) 3811. These entities 3811 and 3821 provide layer management service interfaces through which layer management functions may be invoked.

In order to provide a correct MAC operation, a Station Management Entity (SME) 3830 is present in each STA. The SME 3830 is a layer-independent entity that may be viewed as residing in a separate management plane or as residing off to the side. The exact functions of the SME 3830 are not specified herein, but in general, this entity may be viewed as being responsible for such functions as gathering of information about layer-dependent statuses from various Layer Management Entities (LMEs) and similar setting of the values of layer-specific parameters. The SME 3830 may typically perform such functions on behalf of general system management entities and may implement standard management protocols.

The entities illustrated in FIG. 30 interact with one another in various ways. FIG. 30 illustrates a couple of examples of exchanging GET/SET primitives. An XX-GET.request primitive is used to request the value of a given Management Information Base (MIB) attribute. An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

As illustrated in FIG. 30, the MLME 3811 and the SME 3830 may exchange various MLME_GET/SET primitives via an MLME Service Access Point (MLME_SAP) 3850. Also, various PLCM_GET/SET primitives may be exchanged between the PLME 3821 and the SME 3830 via a PLME_SAP 3860 and between the MLME 3811 and the PLME 3870 via an MLME-PLME_SAP 3870.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In a firmware or software configuration, the method according to the embodiments of the present invention may be implemented in the form of modules, procedures, functions, or the like that perform the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. While the preferred embodiments of the present disclosure have been illustrated and described, the present disclosure is not limited to the foregoing specific embodiments, and those skilled in the art can make various modifications within the scope and spirit of the present disclosure claimed in the appended claims. Further, these modified embodiments should not be understood individually from the technical spirit or perspective of the present disclosure.

Both a product invention and a process invention are described in the present disclosure, and the descriptions of the inventions may be applied complementarily, when needed.

INDUSTRIAL APPLICABILITY

As described above, the embodiments of the present invention may be applied to various wireless communication systems including the IEEE 802.11 system.

What is claimed is:

1. A method for receiving a signal by a station (STA) in a wireless local area network (LAN) system, the method comprising:
receiving a SIG-B field, via a first channel among a transmission bandwidth of a multi-user (MU) frame including data and the SIG-B field,
wherein the SIG-B field comprises a plurality of resource allocation information comprising (i) first resource allocation information for the first channel and (ii) second resource allocation information for each of at least one paired channel which the first channel is paired with,
wherein the first resource allocation information and the second resource allocation information for each of the at least one paired channel comprise a resource allocation pattern for a corresponding channel, respectively; and
receiving the data of the MU frame via (i) one of the at least one paired channel and (ii) a resource in the one of the at least one paired channel,
wherein, (i) the one of the at least one paired channel and (ii) the resource in the one of the at least one paired channel are determined based on a mapping between (i) the plurality of resource allocation information and (ii)

an order of user-specific information for the STA among a plurality of user-specific information included in the SIG-B field.

2. The method of claim 1, wherein the first resource allocation information and the second resource allocation information for each of the at least one paired channel are included in the plurality of resource allocation information based on an order of the first channel and the at least one paired channel.

3. The method of claim 1, wherein the first channel and the at least one paired channel are configured to have an interval with 20 MHz.

4. The method of claim 3, wherein a bandwidth of the first channel is 20 MHz, and
wherein a bandwidth of the one of the at least one paired channel is 20 MHz.

5. The method of claim 1, wherein the plurality of resource allocation information is received via the at least one paired channel additionally.

6. The method of claim 1, wherein, based on 80 MHz transmission, the plurality of resource allocation information comprises (i) the first resource allocation for the first channel, and (ii) one of the second resource allocation information for one paired channel which the first channel is paired with, and
wherein, based on 160 MHz transmission, the plurality of resource allocation information comprises (i) the first resource allocation for the first channel, and (ii) three of the second resource allocation information for three paired channels which the first channel is paired with.

7. The method of claim 1, wherein the SIG-B field comprises a common field and a user-specific field,
wherein the plurality of resource allocation information is included in the common field,
wherein the plurality of user-specific information is included in the user-specific field, and
wherein the plurality of user-specific information is encoded in a unit of 2 users in one or more non-final blocks and remaining of the plurality of user-specific information is encoded in a unit of 1 or 2 users in a final block.

8. A station (STA) in a wireless local area network (LAN) system, the STA comprising:
a receiver; and
a processor operably coupled with the receiver and configured to:
receive a SIG-B field, via a first channel among a transmission bandwidth of a multi-user (MU) frame including data and the SIG-B field,
wherein the SIG-B field comprises a plurality of resource allocation information comprising (i) first resource allocation information for the first channel and (ii) second resource allocation information for each of at least one paired channel which the first channel is paired with,
wherein the first resource allocation information and the second resource allocation information for each of the at least one paired channel comprise a resource allocation pattern for a corresponding channel, respectively; and
receive the data of the MU frame via (i) one or the at least one paired channel and (ii) a resource in the one of the at least one paired channel,
wherein, (i) the one of the at least one paired channel and (ii) the resource in the one of the at least one paired channel are determined based on a mapping between (i) the plurality of resource allocation information and (ii) an order of user-specific information for the STA among a plurality of user-specific information included in the SIG-B field.

9. The STA of claim 8, wherein, based on 80 MHz transmission, the plurality of resource allocation information comprises (i) the first resource allocation for the first channel, and (ii) one of the second resource allocation information for one paired channel which the first channel is paired with, and
wherein, based on 160 MHz transmission, the plurality of resource allocation information comprises (i) the first resource allocation for the first channel, and (ii) three of the second resource allocation information for three paired channels which the first channel is paired with.

10. The STA of claim 8, wherein the SIG-B field comprises a common field and a user-specific field,
wherein the plurality of resource allocation information is included in the common field,
wherein the plurality of user-specific information is included in the user-specific field, and
wherein the plurality of user-specific information is encoded in a unit of 2 users in one or more non-final block and remaining of the plurality of user-specific information is encoded in a unit of 1 or 2 users in final block.

11. A method for transmitting a signal by an access point (AP) in a wireless local area network (LAN) system, the method comprising:
transmitting a SIG-B field, via a first channel among a transmission bandwidth of a multi-user (MU) frame including data for a station (STA) and the SIG-B field,
wherein the SIG-B field comprises a plurality of resource allocation information comprising (i) first resource allocation information for the first channel (ii) second resource allocation information for each of and at least one paired channel which the first channel is paired with,
wherein the first resource allocation information and the second resource allocation information for each of the at least one paired channel comprise a resource allocation pattern for corresponding channel, respectively; and
transmitting the data of the station via (i) one of the at least one paired channel and (ii) a resource in the one of the at least one paired channel,
wherein, (i) the one of the at least one paired channel and (ii) the resource in the one of the at least one paired channel are determined based on a mapping between (i) the plurality of resource allocation information and (ii) an order of user-specific information for the STA among a plurality of user-specific information included in the SIG-B field.

12. The method of claim 11, wherein the first resource allocation information and the second resource allocation information for each of the at least one paired channel are included in the plurality of resource allocation information based on an order of the first channel and the at least one paired channel.

13. The method of claim 11, wherein the first channel and the at least one paired channel are configured to have an interval with 20 MHz.

14. The method of claim 13, wherein a bandwidth of the first channel is 20 MHz, and
wherein a bandwidth of the one of the at least one paired channel is 20 MHz.

15. The method of claim 11, wherein the plurality of resource allocation information is received via the at least one paired channel additionally.

16. The method of claim 11, wherein, based on 80 MHz transmission, the plurality of resource allocation information comprises (i) the first resource allocation for the first channel, and (ii) one of the second resource allocation information for one paired channel which the first channel is paired with, and wherein, based on 160 MHz transmission, the plurality of resource allocation information comprises (i) the first resource allocation for the first channel, and (ii) three of the second resource allocation information for three paired channels which the first channel is paired with.

17. The method of claim 11, wherein the SIG-B field comprises a common field and a user-specific field, wherein the plurality of resource allocation information is included in the common field, wherein the plurality of user-specific information is included in the user-specific field, and wherein the plurality of user-specific information is encoded in a unit of 2 users in one or more non-final blocks and remaining of the plurality of user-specific information is encoded in a unit of 1 or 2 users in a final block.

\* \* \* \* \*